United States Patent
Tsirkin

(10) Patent No.: US 10,965,641 B2
(45) Date of Patent: Mar. 30, 2021

(54) LIVE VIRTUAL MACHINE MIGRATION UTILIZING NETWORK ADDRESS POOLS

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 15/835,151

(22) Filed: Dec. 7, 2017

(65) Prior Publication Data

US 2019/0182207 A1   Jun. 13, 2019

(51) Int. Cl.
*H04L 29/12* (2006.01)
*G06F 9/48* (2006.01)
*G06F 9/455* (2018.01)

(52) U.S. Cl.
CPC ...... *H04L 61/2061* (2013.01); *G06F 9/45558* (2013.01); *G06F 9/4856* (2013.01); *H04L 61/2007* (2013.01); *H04L 61/2084* (2013.01); *G06F 2009/4557* (2013.01); *G06F 2009/45595* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 7,013,482 B1 | 3/2006 | Krumel | |
| 7,492,787 B2 | 2/2009 | Ji et al. | |
| 7,761,573 B2 | 7/2010 | Travostino et al. | |
| 8,396,986 B2 | 3/2013 | Kanada et al. | |
| 8,413,147 B2 | 4/2013 | Shen et al. | |
| 8,429,647 B2 | 4/2013 | Zhou et al. | |
| 8,539,045 B2 | 9/2013 | Kang et al. | |
| 8,819,678 B2 | 8/2014 | Tsirkin | |

(Continued)

FOREIGN PATENT DOCUMENTS

| | | |
|---|---|---|
| CN | 103299278 A | 9/2013 |
| CN | 105208048 A | 12/2015 |

(Continued)

OTHER PUBLICATIONS

VMware "Move a Virtual Machine to a New Location or Host" Jul. 28, 2017, 1 page.

(Continued)

*Primary Examiner* — Philip C Lee
(74) *Attorney, Agent, or Firm* — Lowenstein Sandler LLP

(57) ABSTRACT

Aspects of the disclosure provide for mechanisms for live virtual machine migration. A method of the disclosure includes: performing, by a processing device, at least one operation to migrate a virtual machine from a source computer system to a destination computer system, wherein the virtual machine is associated with a first network address; assigning, to the virtual machine, a second network address from a pool of network addresses, wherein the pool of network addresses is associated with a destination hypervisor running on the destination computer system; receiving, from a source hypervisor running on the source computer system, a data packet directed to the first network address and forwarded to the destination hypervisor using the second network address; and forwarding, by the destination hypervisor, the data packet to the virtual machine.

20 Claims, 12 Drawing Sheets

(56) References Cited

U.S. PATENT DOCUMENTS

| | | | |
|---|---|---|---|
| 8,850,430 | B2 | 9/2014 | Hayward et al. |
| 8,924,560 | B2 | 12/2014 | Pang et al. |
| 8,966,495 | B2 | 2/2015 | Kulkarni |
| 9,008,084 | B2 | 4/2015 | Zhang et al. |
| 9,081,603 | B2 | 7/2015 | Zhang et al. |
| 9,104,460 | B2 | 8/2015 | Jansen |
| 9,141,625 | B1 | 9/2015 | Thornewell et al. |
| 9,160,668 | B2 | 10/2015 | Tripathi et al. |
| 9,229,755 | B2 | 1/2016 | Dow et al. |
| 9,336,042 | B1 | 5/2016 | Brenneman et al. |
| 9,350,614 | B2 | 5/2016 | Zeng et al. |
| 9,396,022 | B2 | 7/2016 | Miyazaki |
| 9,424,144 | B2 | 8/2016 | Sridharan et al. |
| 9,565,126 | B2 | 2/2017 | Narayanasamy et al. |
| 9,628,290 | B2 | 4/2017 | Banavalikar et al. |
| 9,836,327 | B1 * | 12/2017 | Brouwer ............... G06F 9/5077 |
| 2008/0222375 | A1 | 9/2008 | Kotsovinos et al. |
| 2009/0183173 | A1 | 7/2009 | Becker et al. |
| 2011/0134931 | A1 | 6/2011 | Merwe et al. |
| 2012/0110181 | A1 | 5/2012 | Tsirkin |
| 2013/0232492 | A1 * | 9/2013 | Wang ................ H04L 61/2084 718/1 |
| 2013/0238802 | A1 * | 9/2013 | Sarikaya ........... H04L 29/08153 709/226 |
| 2013/0262647 | A1 * | 10/2013 | Kurita ....................... G06F 9/54 709/223 |
| 2013/0275592 | A1 | 10/2013 | Xu et al. |
| 2013/0305242 | A1 | 11/2013 | Wang et al. |
| 2014/0007089 | A1 | 1/2014 | Bosch et al. |
| 2014/0025821 | A1 * | 1/2014 | Baphna ............... H04L 61/2061 709/226 |
| 2014/0289399 | A1 | 9/2014 | Shimokuni et al. |
| 2014/0297889 | A1 | 10/2014 | Dong et al. |
| 2014/0298335 | A1 | 10/2014 | Regev et al. |
| 2015/0029856 | A1 | 1/2015 | Rozenberg |
| 2015/0117256 | A1 * | 4/2015 | Sabaa ..................... H04L 49/15 370/254 |
| 2015/0222515 | A1 | 8/2015 | Mimura et al. |
| 2015/0309818 | A1 | 10/2015 | Lee et al. |
| 2015/0370596 | A1 | 12/2015 | Fahs et al. |
| 2015/0378759 | A1 * | 12/2015 | Pershin ............... G06F 9/45558 718/1 |
| 2016/0004548 | A1 | 1/2016 | Suzuki et al. |
| 2016/0070601 | A1 | 3/2016 | Yamamoto et al. |
| 2016/0077935 | A1 | 3/2016 | Zheng et al. |
| 2016/0103699 | A1 | 4/2016 | Thakkar et al. |
| 2016/0117185 | A1 | 4/2016 | Fang et al. |
| 2016/0246632 | A1 | 8/2016 | Tsirkin |
| 2016/0323245 | A1 | 11/2016 | Shieh et al. |
| 2016/0378530 | A1 | 12/2016 | Ramasubramanian et al. |
| 2017/0005923 | A1 | 1/2017 | Babakian |
| 2017/0019328 | A1 | 1/2017 | Moreno et al. |
| 2017/0139742 | A1 | 5/2017 | Cropper et al. |
| 2017/0264496 | A1 | 9/2017 | Ao et al. |
| 2017/0359414 | A1 | 12/2017 | Sengupta et al. |
| 2018/0091591 | A1 | 3/2018 | Puri et al. |

FOREIGN PATENT DOCUMENTS

| | | |
|---|---|---|
| EP | 2698957 B1 | 7/2016 |
| WO | 2012051884 A1 | 4/2012 |
| WO | 2012119390 A1 | 9/2012 |
| WO | 2017210641 A1 | 12/2017 |

OTHER PUBLICATIONS

Silvera et al,, "IP Mobility to Support Live Migration of Virtrual Machines Across Subnets", SYSTRO May 4-6, 2009, 10 pages.

Kalim et al., "Seamless Migration of Virtual Machines Across Networks", IEEE, 2013, 7 pages.

Bifulco, et al., "Transparent Migration of Virtual Infrastructures in Large Datacenters for Cloud Computing", IEEE, 2011, pp. 179-184.

USPTO, Notice of Allowance for U.S. Appl. No. 15/691,522, dated Jun. 24, 2019.

USPTO, Office Action for U.S. Appl. No. 15/691,605, dated Jun. 13, 2019.

USPTO, Office Action for U.S. Appl. No. 15/688,791, dated Mar. 21, 2019.

USPTO, Office Action for U.S. Appl. No. 15/684,650, dated Feb. 7, 2019.

USPTO, Office Action for U.S. Appl. No. 15/900,396, dated Feb. 25, 2019.

Nachum, Youval, et al. "Scaling the Address Resolution Protocol for Large Data Center (SARP)", http://tools.ietf.org/id/draft-nachum-sarp-04.txt, Feb. 24, 2013, 6 pages.

Nobel, Rickard, "The vSwitch Notify Switches Setting", Rickard Nobel Vmware, Window, Storage and Networking, http://rickardnobel.se/vswitch-notifiy-switches-setting/ Jul. 14, 2012, 15 pages.

Gigamon, "Network Monitoring for Virtual Server Environments", Solution Brief, https://www.gigamon.com/sites/default/files/resources/solutions/sb-nelwork-monitoring-for-virtual-server-environments-3115.pdf, 2014, 2 pages.

Vaes, Karim, "Azure: How to Prepare for Maintenance Impacting your Virtual Machines", The insights of a Quirky Cloud Solution Architect on his Journey Through the Fast Paced IT Landscape, http://kvaes.wordpress.com/2017/02/13/azure-how-to-prepare-for-maintenance-impacting-your-virtual-machines/, Feb. 13, 2017, 6 pages.

Microsoft Corporation, "Simplify Virtual Machine Management and Migration with Ethernet Fabrics in the Datacenter", http://www.brocade.com/content/dam/common/documents/content-types/whitepaper/brocade-ms-ethernet-fabric-solution-blueprint.pdf, Mar. 2011, 20 pages.

Li et al., "HyperMIP: Hypervisor Controlled Mobile IP for Virtual Machine Live Migration Across Networks", School of Computer Science and Engineering, Beihang University, Beijing, China, accessed, Jun. 28, 2017, 9 pages, https://pdfs.semanticscholar.gor/661e/4e7dcde6197740184466a16daf7397238184.pdf.

"A Virtual Machine Loses Network Connectivity after vMotion (1007464)", VMWare Knowledge Base, Nov. 29, 2016, 2 pages, https://kb.vmware.com/selfservice/microsites/search.do?language=en_US&cmd=displayKC&externalId=1007464.

Wang et al., "Virtual Routers on the Move: Live Router Migration as a Network-Management Primitive", Princeton University, Princeton, NJ, USA; AT&T Labs—Research, Florham Park, NJ, USA, Aug. 17-22, 2008, 12 pages, http://www.cs.princeton.edu/courses/archive/fall10/cos561/papers/VROOM08.pdf.

Cully et al., "Remus: High Availability via Asynchronous Virtual Machine Replication", Department of Computer Science the University of British Columbia, accessed Jun. 27, 2017, 21 pages, http://www.usenix.org/legacy/event/nsdi08/tech/full_papers/cully/cully_html/.

Stuart, Morgan, "Mitigating Interference during Virtual Machine Live Migration through Storage Offloading", retrived tom http://scholarscompass.vcu.edu/cgi/viewcontent.cgi?referer=https://www.google.co.in/&httpsredir=1&article=5724&context=etd, Virginia Commonwealth University, Richmond, Virginia, USA, Dec. 2016, 71 pages.

Shen, Z, et al., "Follow the Sun through the Clouds: Application Migration for Geographically Shifting Workloads", retrived from https://pdfs.semanticscholar.org/e76e/6d0753a4136337f1d10d94257825bd7a1cfd.pdf, Cornell University, In SoCC. ACM, Oct. 5-7, 2016, 14 pages.

* cited by examiner

US 10,965,641 B2

LIVE VIRTUAL MACHINE MIGRATION UTILIZING NETWORK ADDRESS POOLS

TECHNICAL FIELD

The implementations of the disclosure relate generally to computer systems and, more specifically, to methods and systems for virtual machine migration.

BACKGROUND

A virtualized computer system can include one or more host machines and run one or more hypervisors on the host machines. Each hypervisor can support one or more virtual machines, with each of the virtual machines running one or more applications under a guest operating system. From time to time, a virtual machine in the virtualized computer system may be moved (e.g., migrated) from one host machine to another host machine for a variety of reasons, such as load balancing on the host machines, upgrades of software and/or hardware of the host machines, etc.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
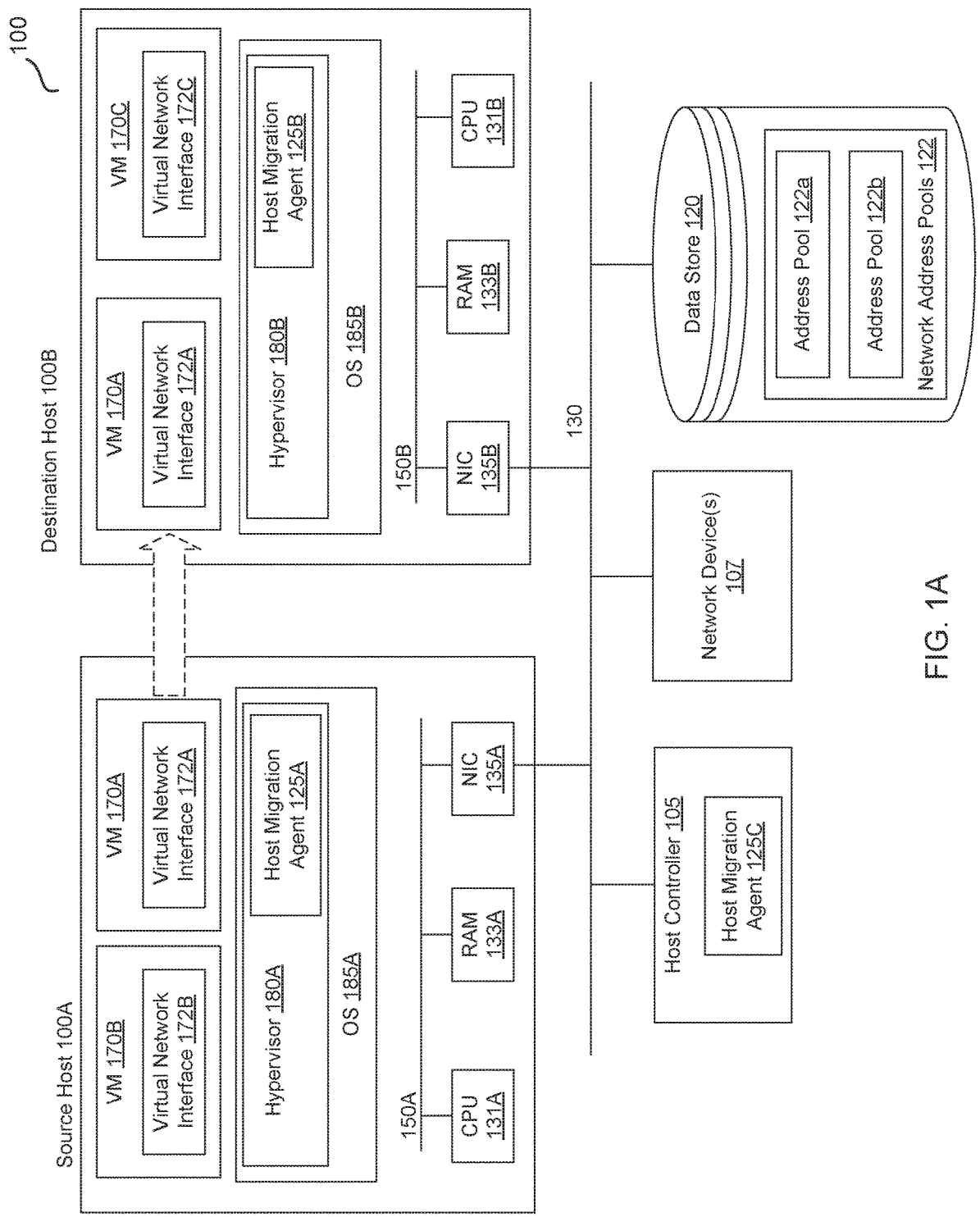
FIGS. 1A and 1B are block diagrams illustrating example computer systems according to some embodiments of the present disclosure.

Aspects of the disclosure provide for mechanisms for virtual machine migration in a computer system. A virtual machine residing on a host computer system (e.g., the source host computer system) may be migrated to a different host computer system (e.g., the destination host computer system). During the migration, the virtual machine can be disassociated from the source hypervisor running on the source host computer system and can be associated with the destination hypervisor running on the destination computer system. The network location of the virtual machine is considered as changed after the migration. Network devices in the network to which the new hypervisor is coupled may need to be notified of the virtual machine's new association with the new hypervisor so that the virtual machine can continue to communicate with the network devices after migration. For example, while a media access control (MAC) address and/or an Internet Protocol (IP) address of the virtual machine may not have to be changed after the migration, one or more network devices (e.g., one or more data link layer switches) may need to be reconfigured to facilitate communications for the virtual machine. More particularly, for example, the destination host and the source host may be connected to different switches and/or different switch ports. When the virtual machine is migrated to the destination host, the switch ports to which the destination host is connected may need to be reconfigured to be associated with the virtual machine.

Prior solutions for virtual machine migration rely on network notifications (e.g., notifications including a media access control (MAC) address of the virtual machine) to announce the new location of the virtual machine. For example, the destination hypervisor may broadcast such notifications as the source hypervisor on behalf of the virtual machine undergoing migration. However, these notification packets may be lost or delayed during transmission. As a result, the destination hypervisor may need to retransmit the notifications. This may cause significant downtime and negative performance impact for an end user of the virtual machine.

Aspects of the disclosure address the above deficiencies by providing mechanisms (e.g., systems, methods, machine-readable media, etc.) for live virtual machine migration utilizing network address pools. For example, the mechanisms can generate a plurality of network address pools and associate each of the network address pools with a computer system that may implement virtual machine migration. Each of the network address pools can be a pool of network addresses that are not associated with a virtual machine (e.g., not associated with a virtual network interface of a virtual machine). As such, the network addresses in the network address pools can be used as temporary network addresses for virtual machine migrations.

In some embodiments, a virtual machine may be migrated from a source computer system to a destination computer system. The virtual machine may be associated with a first network address, such as a data link layer address associated with a virtual network interface of the virtual machine. A destination hypervisor can select a network address (also referred to as the "second network address") from a network address pool associated with the destination computer system. The destination hypervisor can then associate the second network address with the virtual machine. The destination hypervisor can also broadcast one or more messages to notify the source hypervisor of the association of the second network address with the virtual machine. Upon receiving the messages, the source hypervisor can store data about the association of the second network address with the virtual machine.

The source hypervisor can relay data for the virtual machine after the migration of the virtual machine (e.g., after the virtual machine is stopped on the source computer system). For example, upon receiving a data packet directed to the first network address, the source hypervisor can forward the data packet to the destination hypervisor. More particularly, for example, the source hypervisor can change the destination address of the data packet to the second network address and retransmit the data packet. The destination address of the data packet may be changed without adding data (e.g., metadata) to the data packet. As such, the size of the data packet is not changed.

Upon receiving the data packet, the destination hypervisor can forward the data packet to the virtual machine. For example, the destination hypervisor can change the destination address of the received data packet to the first network address and can then forward the data packet to the virtual machine. Given that the size of the data packet is not changed before it is forwarded to the destination hypervisor, the destination hypervisor may have enough resources to process data forwarded from the source hypervisor as long as the network is balanced.

In some embodiments, the source hypervisor can relay data for the virtual machine running on the destination computer system until a predefined condition is satisfied. The predefined condition can include, for example, that the source hypervisor receives a first amount of data directed to the virtual machine during a predetermined time period and that the first amount of data is not greater than a threshold amount of data. The predefined condition can also include, for example, that a predefined time period has passed after the migration of the virtual machine from the source computer system to the destination computer system.

The mechanisms described herein include technology that enhances virtual machine migration in virtualized computer systems. In particular, aspects of the present disclosure provide technology that enables live virtual machine migration utilizing network address pools associated with destination computer systems. This may enable a migrating virtual machine to receive data sent to the source hypervisor after the migrating virtual machine has been stopped on the source computer system. This may reduce, minimize, and/or eliminate downtime in virtual machine migration processes. Moreover, by using the network addresses in the network address pools as temporary network addresses for migrating virtual machines, the mechanisms described herein avoid overhead at all times, instead only incurring it while a virtual machine is migrated.

Furthermore, the number of network addresses in the network addresses pools does not have to be proportional to the total number of virtual machines in a network. For example, the number of network addresses in a network address pool associated with a particular computer system can be determined based on the number of virtual machines migrated to the computer system during a predetermined time period. As such, the mechanisms described herein can implement live virtual machine migration utilizing a number of network addresses linear in the size of the network and can reduce the number of network addresses required in the pools and the number of notifications broadcast regarding the network address pools.

Figure 1B:
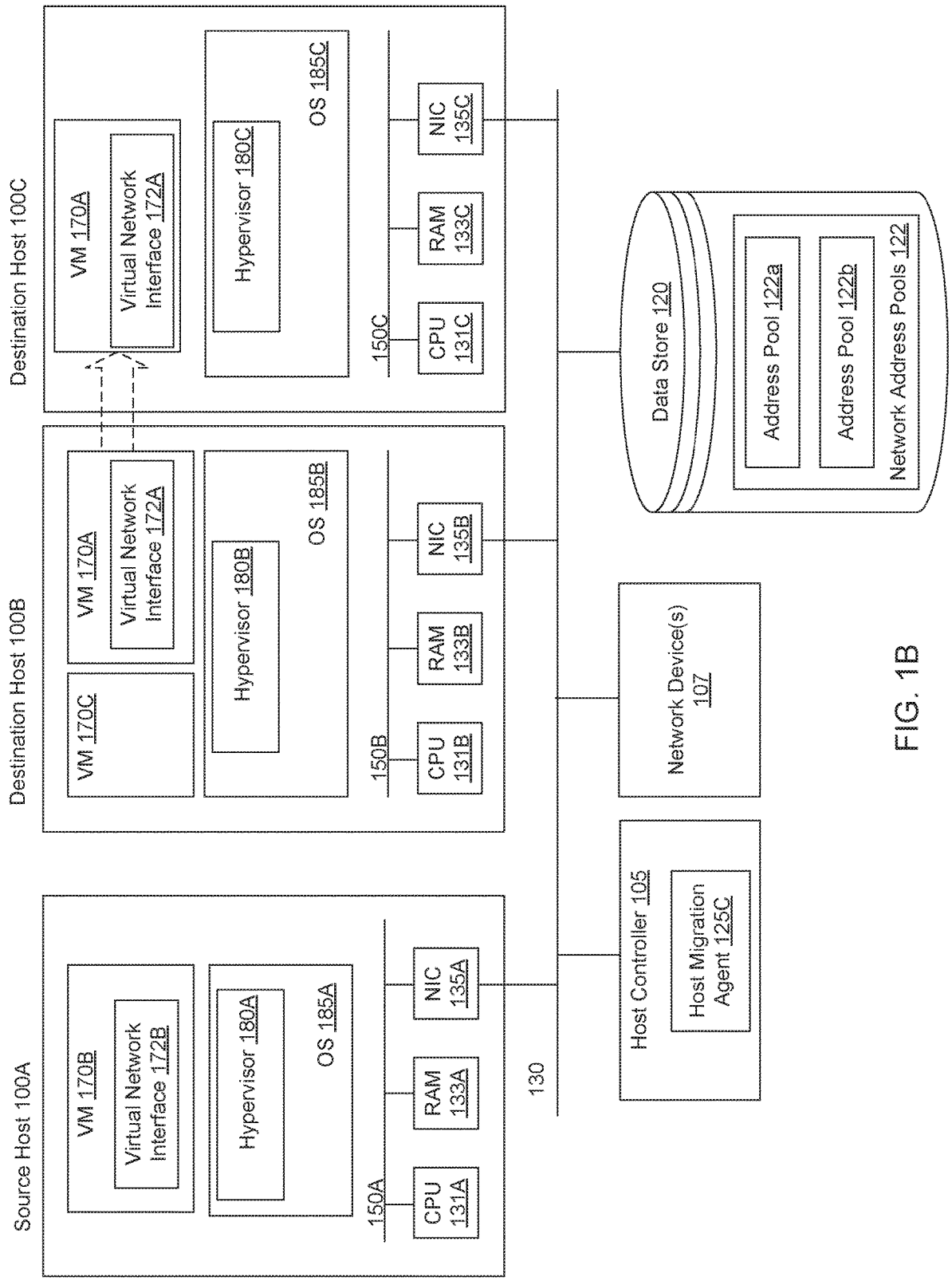

FIGS. 1A-1B are block diagrams of an example 100 of a computer system according to some embodiments of the present disclosure. Computer system 100 can include one or more computer systems, such as host computer systems 100A, 100B, 100C in accordance with one or more aspects of the present disclosure. "Computer system" as used herein may be and/or include a system comprising one or more processors, one or more memory devices, and one or more input/output (I/O) interfaces.

As illustrated in FIG. 1A, host computer systems 100A and 100B may be interconnected via a network 130. Network 130 can include a private network (e.g., a local area network (LAN)), a wide area network (WAN), intranet, etc.), a public network (e.g., the Internet), etc.

Each host computer system 100A, 100B may comprise one or more processors 131 (e.g., processors 131A and 131B) communicatively coupled to a memory device 133 (e.g., memory devices 133A and 133B) and a network interface controller (NIC) 135 (e.g., NIC 135A and NIC 135B). Local connections within host computer system 100A, 100B, including connections between processor 131, memory device 133, and NIC 135, may be provided by one or more local buses 150 (e.g., buses 150A and 150B) of a suitable architecture.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some embodiments.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

As illustrated in FIG. 1, each host computer system 100 (e.g., host 100A, 100B) may run multiple virtual machines 170 (e.g., virtual machines 170A, 170B, 170C, etc.) by executing a software layer 180 (e.g., software layer 180A, 180B), often referred to as "hypervisor," above the hardware and below the virtual machines. In certain implementations, hypervisor 180 may be a component of operating system 185 (e.g., operating systems 185A, 185B) executed by the corresponding host computer system 100. Alternatively, hypervisor 180 may be provided by an application running under host operating system 185, or may run directly on the corresponding host computer system 100 without an operating system beneath it. Hypervisor 180 may abstract the physical layer, including processors, memory, I/O devices, etc. and present this abstraction to virtual machines 170 as virtual devices, including virtual processors, virtual memory, virtual I/O devices, etc. Host migration agents 125A, 125B running on the respective host computer system 100A, 100B may perform virtual machine migration management functions in accordance with one or more aspects of the present disclosure. In certain implementations, a host migration agent may be implemented as a software component invoked by hypervisor 180A, 180B. Alternatively, functions of host migration agent 125A, 125B may be performed by hypervisor 180A, 180B. In some embodiments, each of host migration agents 125A, 125B, and 125C can implement one or more aspects of the present disclosure as described in connection with FIGS. 2-10.

A hypervisor may abstract the physical layer and present this abstraction to virtual machines to use, by providing interfaces between the underlying hardware and virtual devices of virtual machines. Network interface virtualization may be implemented by hypervisor 180A-B and may provide virtual machines 170A-C access to physical network interfaces 135a-b via virtual network interfaces 172A-C.

Physical network interfaces 135A-B may be computer hardware components that connect a computer system in system 100 to network 130. Each computer hardware component may be a network interface controller (NIC) that supports a specific physical layer and data link layer standard such as Ethernet, Fibre Channel, Wi-Fi, Token Ring or other similar networking protocol. Each of physical network interfaces 135A-B may be associated with one or more network addresses that are associated with different networking layers. For example, a physical network interface may be associated with an OSI (Open Systems Interconnection) layer 2 address, which may be represented by a link layer address (e.g., a MAC address). The physical network interface may also be associated with one or more network addresses at a different OSI layers, such as layer 3 (an Internet Protocol (IP) address).

Virtual network interfaces 172A-C may be an abstract virtualized representation of a computer network interface. Each virtualized network interface may or may not correspond to a physical network interface. Likewise, each of virtual network interfaces 172A-C may be associated with one or more network addresses that are associated with different networking layers, for example, a virtual network interface may be associated with an OSI layer two 2 address, which may be represented by a link layer address (e.g., a MAC address). In another example, a virtual network interface may be further associated with one or more network addresses at a different OSI layers, such as layer 3 (an Internet Protocol (IP) address).

Virtual network interfaces 172A-C may be created when a virtual machine is generated (e.g., virtual machine image creation) or when the virtual machine is instantiated (e.g., executed). Virtual network interfaces 172A-C may also be generated during the operation of the virtual machine, for example, a user may log into a virtual machine and initiate the creation of a new virtual network interface while the virtual machine is running.

As schematically illustrated by FIG. 1A, each of host computer systems 100A and 100B may be communicatively coupled to a host controller 105 which may reside on a designated computer system or on one of the hosts 100A, 100B. Host controller 105 may manage a plurality of virtual machines, including virtual machines 170A, 170B, and 170C. Host controller 105 may create a virtual machine, delete a virtual machine, and perform any other virtual machine management functions. In certain implementations, host controller 105 may include a host migration agent 125C which may manage live migration of virtual machines between host computer systems 100A and 100B in accordance with one or more aspects of the present disclosure.

For example, host controller 105 can manage network address pools (e.g., network address pools 122) for the host computer systems to facilitate live migration of virtual machines among the computer systems. In some embodiments, host controller 105 can generate one or more network address pools 122 (e.g., a first network address pool 122a, a second network address pool 122b, etc.) and can associate each of the network address pools with a computer system. For example, a first network address pool 122a can be associated with host computer system 100B. Each of network address pools 122 can include one or more network addresses, such as one or more data link layer addresses (e.g., MAC addresses). In some embodiments, the network addresses in network address pools 122 are not associated with a virtual network interface of a virtual machine. As will be discussed in more detail below, the network addresses can be assigned to migrating virtual machines as temporary network addresses to enable live migration of the virtual machines. Each of the network address pools can include any suitable number of network addresses to facilitate migration of virtual machines in system 100. For example, a network address pool associated with a given computer system can include a certain number of network addresses that is equal to or greater than the number of virtual machines undergoing migration to the computer system during a predetermined time period.

Host controller 105 can broadcast information about the network address pools and their associated computer systems (e.g. via one or more messages). For example, host controller 105 can broadcast one or more messages indicating the association of a given network address pool with a given computer system (e.g., an association of a first network address pool with computer system 100B). As another example, when a network address in one of the network address pools is assigned to a virtual machine as a temporary network address, host controller 105 can broadcast one or more messages to notify the computer systems in system 100 of the association of the virtual machine and the network address.

In some embodiments, network address pools 122 may be stored in data store 120. Each of network address pools 122 may be represented by a data structure that may be stored in RAM, storage memory, and/or any other memory device. The data structure may be an array or list of elements or any other suitable data structure. Each element of the data structure may represent a network address and may comprise an indicator of the availability state of the corresponding network address. For example, a first state may indicate that the address is available for use and a second state may indicate the address is unavailable for use. A network address may be unavailable for use, for example, when the network address may already be assigned to and/or in use by a virtual machine.

In some embodiments, one or more network devices 107 may be communicatively coupled to one or more computer systems in system 100. For example, each network device 107 can be communicatively coupled to host computer systems 100A and/or 100B via network 130 or any other suitable network. In some embodiments, a network device 107 may be internal to a host computer system (e.g., host 100A, 100B). Alternatively, a network device 107 may be external to the host computer system. Each of the network devices 107 may include a hardware device, an emulated device (e.g., an emulated device in a hypervisor), a software device, or a combination of the above. A network device 107 can include, for example, a switch, a bridge, a network interface card, a router, and/or any other device that can facilitate data transmission for one or more computer systems.

Virtual machine 170A may be migrated from host computer system 100A (also referred to herein as the "source host computer system") to host computer system 100B (also referred to herein as the "destination host computer system"). During the migration, virtual machine 170A (also referred to herein as the "migrating virtual machine") can be disassociated from hypervisor 180A (also referred to herein as the "source hypervisor") and can be associated with hypervisor 180B (also referred to herein as the "destination hypervisor"). The migration process can be initiated in response to receiving a request for virtual machine migration from a user (e.g., a system administrator). The migration process can also be initiated automatically by the source hypervisor. The migration process may be initiated by performing any operation to migrate virtual machine 170A from the origin computer system to the destination computer system. The migration of virtual machine 170A can be a live migration in some embodiments. For example, the migration can be performed while virtual machine 170A is still running on the source host computer system 100A. Virtual machine 170A is not disconnected from its applications and/or clients during the migration.

Source hypervisor 180A may receive a notification from virtual machine 170A undergoing migration. The notification may include one or more network addresses associated with one or more virtual network interfaces 135 of virtual machine 170A. The network addresses may include one or more data link layer addresses (e.g., Media Access Control (MAC) addresses). In certain implementations, the notification may further include one or more VLAN identifiers associated with one or more virtual network interfaces 172 of virtual machine 170A. In an illustrative example, VLAN identifiers associated with one or more virtual network interfaces 172 of virtual machine 170A may conform to IEEE 802.1Q standard defining a system of VLAN tagging for Ethernet frames and procedures to be followed by data link layer devices (bridges and switches) in handling such frames. In an illustrative example, a VLAN identifier may be provided by a 32-bit field inserted between the source MAC address and the EtherType/length fields of the original Ethernet frame.

Responsive to receiving the notification from virtual machine 170A, source hypervisor 180A may forward the notification to destination hypervisor 180B. In some embodiments, source hypervisor 180A may store the received notification in a memory location which is mapped into the address space of virtual machine 170A, and thus the notification will be transmitted to destination host 100B as part of the state of virtual machine 170A. Alternatively, source hypervisor 180A may encapsulate the notification into a message which is transmitted to destination hypervisor 180B over network 130.

Responsive to receiving the notification from source hypervisor 180A, destination hypervisor 180B may generate one or more notification messages to announce the new location of virtual network interfaces of virtual machine 170A, in order to ensure successful delivery of data link layer frames addressed to virtual machine 170A residing at destination host 100B. In some embodiments in which virtual machine 170A has two or more virtual network interfaces 172, a separate notification message may be constructed for each virtual network interface 172, and may be broadcasted over network 130 to which the corresponding virtual network interface 172 is connected.

In an illustrative example, the destination hypervisor 180B may generate a notification message for the migration of virtual machine 170A by appending one or more data link layer and/or network layer headers to the body of the notification message that has been received from the source hypervisor. Each notification message may comprise a data link layer address (e.g., a MAC address) associated with a virtual network interface of virtual machine 170A (also referred to herein as the "first network address"). In certain implementations, each notification message may further comprise a VLAN identifier associated with the virtual network interface.

Network reconfiguration can be conducted in view of the notification message. For example, responsive to receiving the notification message, one or more data link layer devices (such as Ethernet switches and/or bridges) may update their respective internal data structures employed for data link layer frame forwarding, to reflect the new location of the network interface associated with the data link layer address specified by the notification message. More particularly, for example, the data link layer device(s) may associate one or more switch ports with the virtual machine (e.g., by associating a data link layer address of the virtual machine with the switch port(s)). In some embodiments, the network reconfiguration can be conducted by performing one or more operations described in connection with FIG. 2 below.

Destination hypervisor 180B can assign a network address in the first network address pool 122a (also referred to herein as the "second network address") to virtual machine 170A. The second network address can be any address in the first network address pool that is not assigned to or used by another virtual machine. The second network address can be a data link layer address (e.g., a MAC address) in some embodiments. The second network address can be assigned to virtual machine 170A upon initiation of the migration of virtual machine 170A and/or performing one or more operations for the migration of virtual machine 170A. Destination hypervisor 180B can broadcast one or more messages to notify other components of system 100 of the association of the second network address with virtual machine 170A. In some embodiments, upon receiving the messages, source hypervisor 180A can store data indicating the association of the second network address with virtual machine 170A.

In some embodiments, destination hypervisor 180B can determine whether the first network address pool 122a is exhausted before assigning a network address to virtual machine 170A. In response to determining that network address pool 122a is not exhausted, destination hypervisor 180B may assign the second network address to virtual machine 170A as described above. Alternatively, in response to determining that network address pool 122a is exhausted, destination hypervisor 180B may not assign a network address in network address pool 122a to virtual machine 170A. In such embodiments, destination hypervisor 180B can relay data for virtual machine 170A in view of the first network address.

The migration of virtual machine 170A may involve one or more stages. In an initial stage of the migration process, the host migration agents 125A and/or 125C may perform one or more copying operations for virtual machine 170A. For example, the host migration agents 125A and/or 125C may copy, over the network 130, an execution state of the migrating virtual machine 170A from the source host 100A to the destination host 100B. The virtual machine execution state may include the memory state, the virtual processor state, the virtual devices state, the connectivity state, etc. of virtual machine 170A. The execution state may include one or more memory pages in some embodiments. The host migration agent 125B can receive the execution state of virtual machine 170A and can store the received execution state. The copying operation can be performed while virtual machine 170A is still running on the source host 100A. Upon completion of the copying operation, the host migration agent 125A and/or 125C may re-copy one or more of the memory pages that have been modified during the copying operation.

In some embodiments, the host computer systems 100A and/or 100B may iteratively perform copying operations for the migration of virtual machine 170A (e.g., by copying the modified memory pages) until a predefined condition has been met. For example, the predefined condition may include a memory pages modifying rate becoming less than a predefined threshold rate. As another example, the predefined condition may include the memory pages modifying rate being less than or equal to the network throughput. As still another example, the predefined condition may be represented by the ratio of the memory pages modifying rate to the virtual machine state transfer rate becoming less than or equal to a predefined threshold ratio.

Source hypervisor 180A, destination hypervisor 180B, and/or host controller 105 can initiate a final stage of the migration process to complete the migration of the virtual machine. For example, host migration agents 125A and/or 125C can stop the migrating virtual machine 170A on the source host 100A. The host migration agents 125A and/or 125C can also copy one or more remaining modified memory pages related to virtual machine 170A (e.g., memory pages that have been modified during the migration process) to the destination hypervisor. The host migration agent 125B and/or 125C can start (e.g., resume) the virtual machine 170A on the destination host 100B. In the final stage, a page fault may be generated by the source hypervisor responsive to detecting the virtual machine's attempt to access a memory page which has not yet been transferred, and the page may be transferred from the source hypervisor to the destination hypervisor responsive to the page fault.

The source hypervisor 180A, the destination hypervisor 180B, and/or host controller 105 can relay data for virtual machine 170A after the migration of the virtual machine 170A (e.g., after virtual machine 170A has been stopped on source computer system 100A and/or started on destination computer system 100B). For example, upon receiving a data packet directed to the first network address (e.g., a data packet having a destination addresses matching the first network address), source hypervisor 180A can forward the data packet to destination hypervisor 180B. More particularly, for example, source hypervisor 180A can replace the destination address of the data packet with the second network address to generate a modified data packet. Source hypervisor 180A can then transmit the modified data packet to destination hypervisor 180B (e.g., via host controller 105, network device(s) 107, and/or any other suitable device).

Upon receiving the modified data packet, destination hypervisor 180B can identify the destination address of the data packet as being the second network address of the network address pool. Destination hypervisor 180B can also identify the association of the second network address with virtual machine 170A. Destination hypervisor 180B can then forward the data packet to virtual machine 170A in view of the second network address. More particularly, for example, destination hypervisor 180B can replace the destination address of the data packet (e.g., the second network address) with the first network address and can forward the data packet to virtual machine 170A.

While relaying data for the migrating virtual machine, the source hypervisor 180A, the destination hypervisor 180B, and/or host controller 105 can determine whether a predetermined condition is satisfied. In some embodiments, satisfaction of the predetermined condition may indicate completion of network reconfiguration for the migration of virtual machine 170A. For example, the predefined condition can include that the source hypervisor 180A receives a first amount of data (e.g., a first number of data packets) directed to virtual machine 170A and that the first amount of data is not greater than a threshold amount of data (e.g., a threshold number of data packets). The first amount of data may be received during a certain time period (e.g., a few seconds, a second, a few minutes, etc.) after the migration of virtual machine 170A (after restart of virtual machine 170A on destination computer system 100B). As another example, the predefined condition can include that a predetermined time period has passed after the migration of virtual machine 170A. As still another example, the predefined condition can include that destination hypervisor 180B has received a threshold amount of data after the migration of virtual machine 170A.

In some embodiments, in response to determining that the predefined condition is satisfied, source hypervisor 180A can stop relaying data for virtual machine 170A. Destination hypervisor 180B can disassociate the second network address from virtual machine 170A. Destination hypervisor 180B can also return the second network address to the first network address pool 122a associated with destination hypervisor 180B. The second network address can later be assigned to another virtual machine undergoing migration to destination computer system 100B to facilitate live VM migration.

In some embodiments, virtual machine 170A may be migrated from destination computer system 100B to another computer system before the predefined condition is satisfied. For example, as illustrated in FIG. 1B, virtual machine 170A can be migrated from destination computer system 100B to destination computer system 100C before the predefined condition is satisfied. Hypervisor 180B and 180C can perform one or more operations to migrate virtual machine 170A to computer system 100C. For example, hypervisor 180B and/or 180C can perform one or more copying operations to copy execution states of virtual machine 170A from computer system 100B to computer system 100C. As another example, hypervisor 180B can stop virtual machine 170A on computer system 100B. Hypervisor 180C can start virtual machine 170A on computer system 100C.

Hypervisor 180C and/or destination computer system 100C can be associated with network address pool 122b (also referred to as the "second network address pool"). The second network address pool can be generated by host controller 105 as described in connection with FIG. 1A. Hypervisor 180C can select a network address (also referred to as the "third network address") from the second network address pool. Hypervisor 180C can then associate the third network address with virtual machine 170A. Hypervisor 180C can also broadcast one or more messages indicating the association of the third network address with virtual machine 170A. In some embodiments, the messages may be transmitted to other computer systems in system 100 via host controller 105. Upon receiving the messages, source hypervisor 180A and/or destination hypervisor 180B can store information indicating the association of the third network address with virtual machine 170A and can use the information to relay data for virtual machine 170A. For example, upon receiving a data packet directed to the first network address, source hypervisor 180A can forward the data packet to hypervisor 180C in view of the first network address and the third network address. More particularly, for example, source hypervisor 180A can change the destination address of the data packet to the third network address and can then transmit the data packet. As another example, upon receiving a data packet directed to the second network address and/or the first network address, hypervisor 180B can forward the data packet to hypervisor 180C (e.g., by changing the destination of the data packet to the third network address).

In some embodiments, one or more aspects of the present disclosure can be implemented by configuring an XDP (eXpress Data Path) script on NIC 135A, 135B, and/or 135C. (e.g., by programming the XDP script to implement one or more embodiments described in connection with FIGS. 3-10.) With XDP hardware offload, various aspects of the present disclosure can be implemented without interrupting source hypervisor 180A.

While computer systems 100A, 100B, and 100C are referred to above as a source computer system or a destination computer system, this is merely illustrative. Each computer system in system 100 can serve as a source computer system or a destination computer system in virtual machine migration. Each computer system in system 100 can include one or more components described in connection with FIGS. 3-5 below. While a certain number of computer systems are illustrated in FIGS. 1A and 1B, this is merely illustrative. It should be noted that system 100 can include any suitable number of computer systems.

Figure 2:
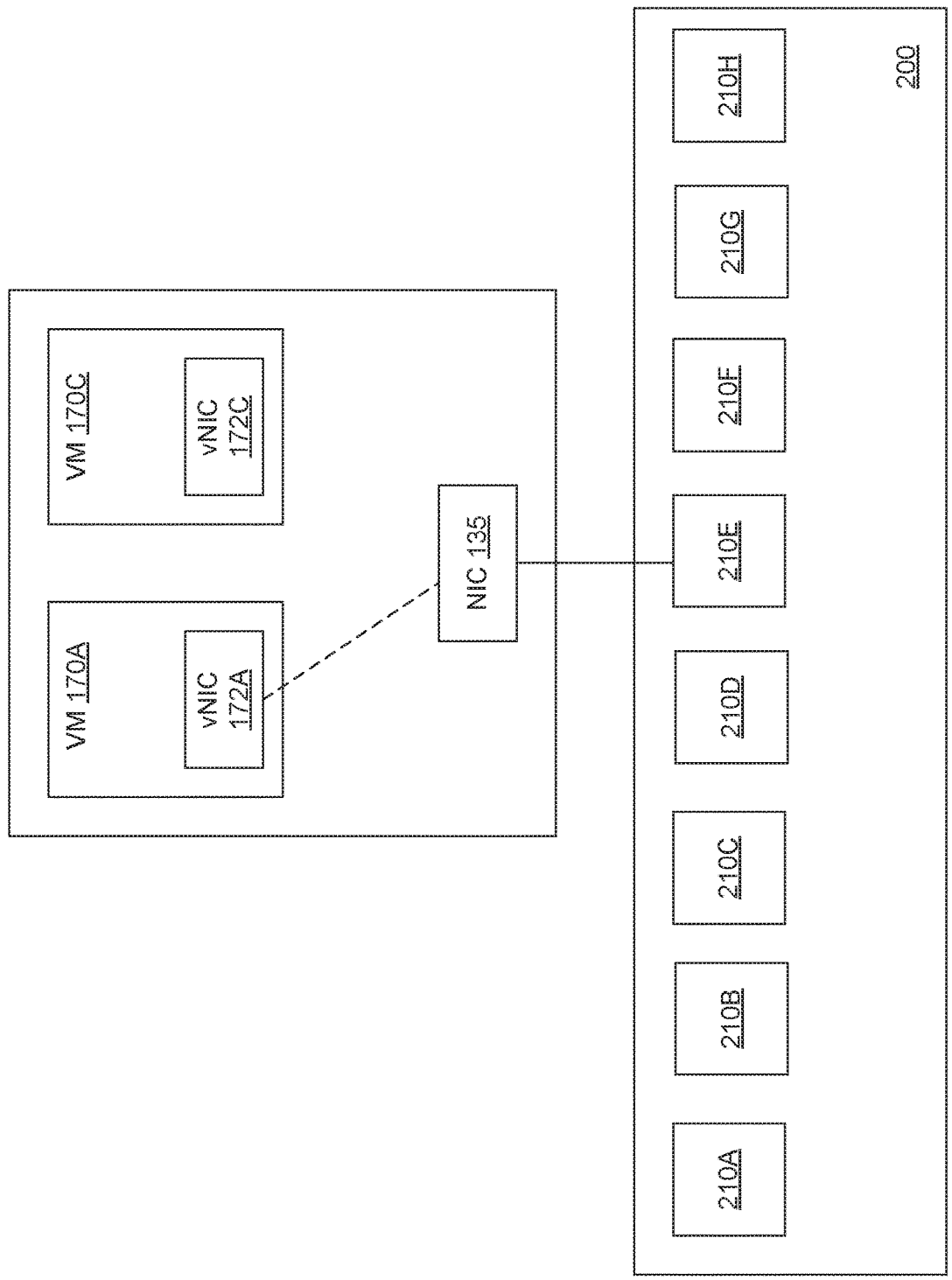
FIG. 2 depicts a schematic diagram illustrating an example of a network device communicating with a virtual machine in accordance with some implementations of the disclosure.

FIG. 2 depicts a schematic diagram illustrating an example 200 of a network device communicating with a virtual machine in accordance with some implementations of the disclosure. In some embodiments, network device 200 can be and/or include a data link layer device (such as an Ethernet switch and/or bridge). In response to receiving a notification including information about a new network location of a migrating virtual machine, network device 200 can update its internal data structure employed for data link layer frame forwarding, to reflect the new location of the network interface associated with the data link layer address specified by the notification. While a media access control (MAC) address and/or an Internet Protocol (IP) address of the virtual machine may not have to be changed after the migration, one or more network devices (e.g., one or more data link layer switches) may need to be reconfigured to facilitate communications for the virtual machine. For example, the destination host and the source host may be connected to different switches and/or different switch ports. When the virtual machine is migrated to the destination host, the switch ports to which the destination host is connected may need to be reconfigured to be associated with the virtual machine. In some embodiments, network device 200 can be a network device 107 of FIG. 1.

As illustrated in FIG. 2, network device 200 can include one or more switch ports 210A, 210B, 210C, 210D, 210E, 210F, 210G, 210H, etc. In the illustrative example of FIG. 2, network device 107 may associate (e.g., by an entry in a memory data structure) the data link layer address of virtual network interface 172A of virtual machine 170A and switch port 210E through which a notification comprising the data link layer address of virtual network interface 172A has been received. In certain implementations, network device 107 may further associate (e.g., by an entry in a memory data structure) one or more VLANs associated with virtual network interface 172A of virtual machine 170A and switch port 210 through which a notification comprising the data link layer address of virtual network interface 172A has been received.

Figure 3:
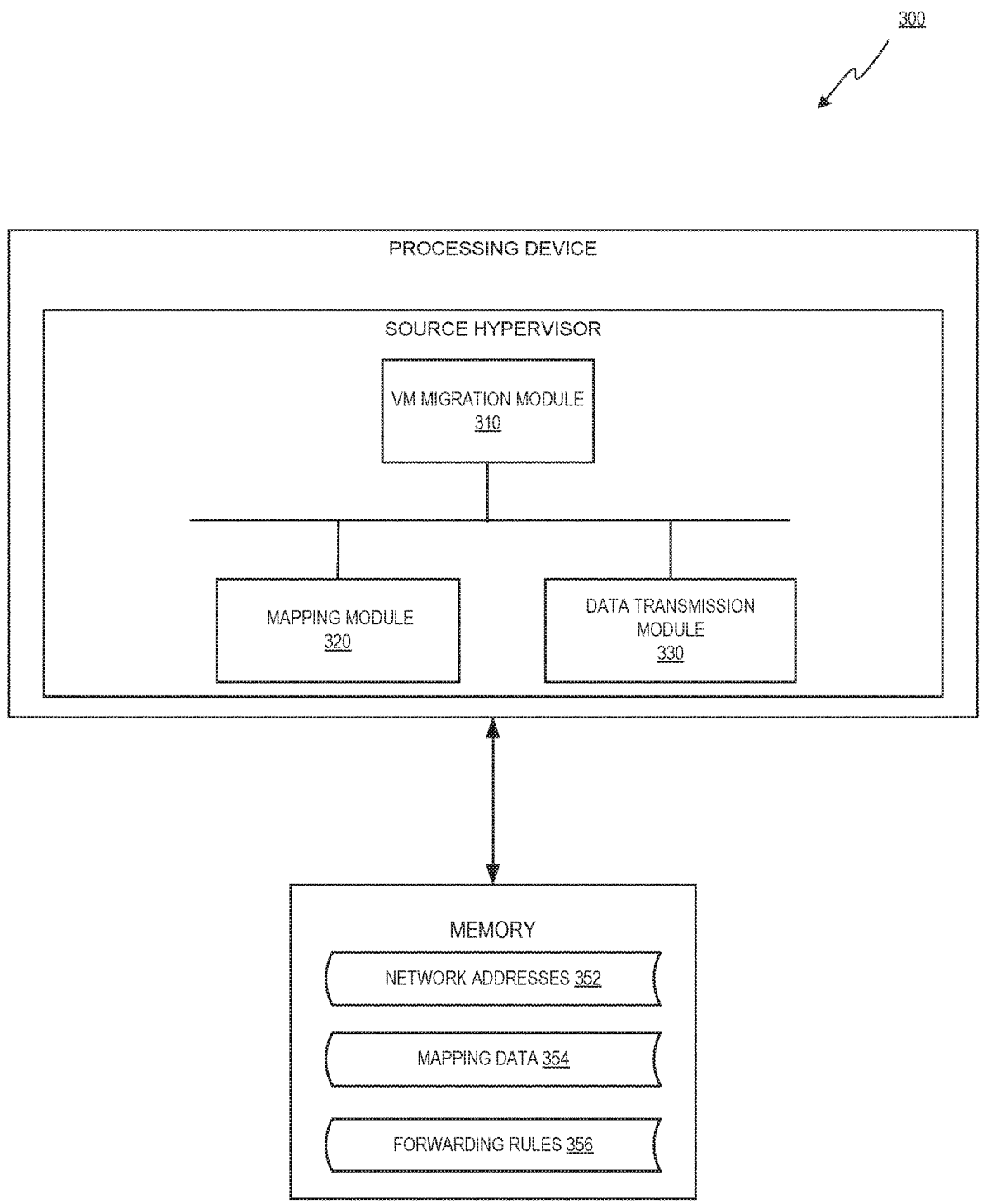
FIG. 3 depicts a block diagram of a computer system implementing a source hypervisor in accordance with some implementations of the disclosure.

FIG. 3 depicts a block diagram of a computer system 300 operating in accordance with one or more aspects of the present disclosure. Computer system 300 may be the same or similar to computer system 100A and may include one or more processing devices and one or more memory devices. In the example shown, computer system 300 may include a virtual machine (VM) migration module 310, a mapping module 320, and a data transmission module 330.

Computer system 300 can also include one or more memory devices storing network address data. The network address data can include any information and/or data about one or more network addresses related to one or more virtual machines. For example, network address data can include one or more network addresses 352. Each of the network addresses 352 can correspond to a network address associated with a virtual machine that is not running on computer system 300 (e.g., a virtual machine that has been migrated from computer system 300 to another computer system). In some embodiments, each of the network addresses can include a data link layer address (e.g., a MAC address). As another example, network address data can include mapping data 354 that can be used to map each of network addresses 352 to a temporary network address. The mapping data can include any suitable data structure that can represent relationships between one of network addresses 352 and its corresponding temporary network address (e.g., a table, a graph, etc.). As a further example, network address data can include one or more forwarding rules 356 that can be used to forward data for one or more virtual machines. The forwarding rules can include, for example, a rule that a data packet is to be retransmitted if a destination address of the data packet matches one of network addresses 352. The forwarding rules may also include one or more rules in view of which the data packet can be retransmitted. For example, the forwarding rules can include one or more rules that instruct the processing device to map the destination address of the data packet to another network address in view of mapping data 354 for retransmission.

VM migration module 310 can perform one or more operations to migrate a virtual machine from a source computer system to a destination computer system. For example, VM migration module 310 can perform one or more copying operations to copy an execution state of the virtual machine from the source computer system to the destination computer system. As another example, VM migration module 310 may send one or more notifications including a network address associated with the virtual machine (e.g., a data link layer address (e.g., a MAC address) associated with a virtual network interface of the virtual machine). As still another example, VM migration module 310 can stop the virtual machine on the source computer system.

Mapping module 320 can enable the processing device 300 to relay data for virtual machines that are not running on computer system 300. For example, upon receiving a data packet directed to a virtual machine, mapping module 320 can identify a destination address of the data packet and can determine whether the destination address matches any of network addresses 352. In some embodiments, in response to determining that the destination address of the data packet matches at least one of the network addresses 352, mapping module 320 can map the destination address to a temporary network address (e.g., a temporary MAC address assigned to the virtual machine). The temporary network address may be a network address from a network address pool associated with a destination hypervisor and/or a destination computer system on which the virtual machine is running. Data transmission module 330 can then retransmit the data packet to the destination hypervisor in view of the temporary network address. For example, data transmission module 330 can replace the destination address of the data packet with the temporary network address before transmitting the data packet.

In some embodiments in which the destination addresses of the data packet does not match any of the network addresses 352, data transmission module 330 can forward the data packet to a virtual machine running on computer system 300. For example, data transmission module 330 can identify a virtual machine associated with the destination address of the data packet and can transmit the data packet to the virtual machine (e.g., via a virtual network interface of the virtual machine that is associated with the destination network address).

Figure 4:
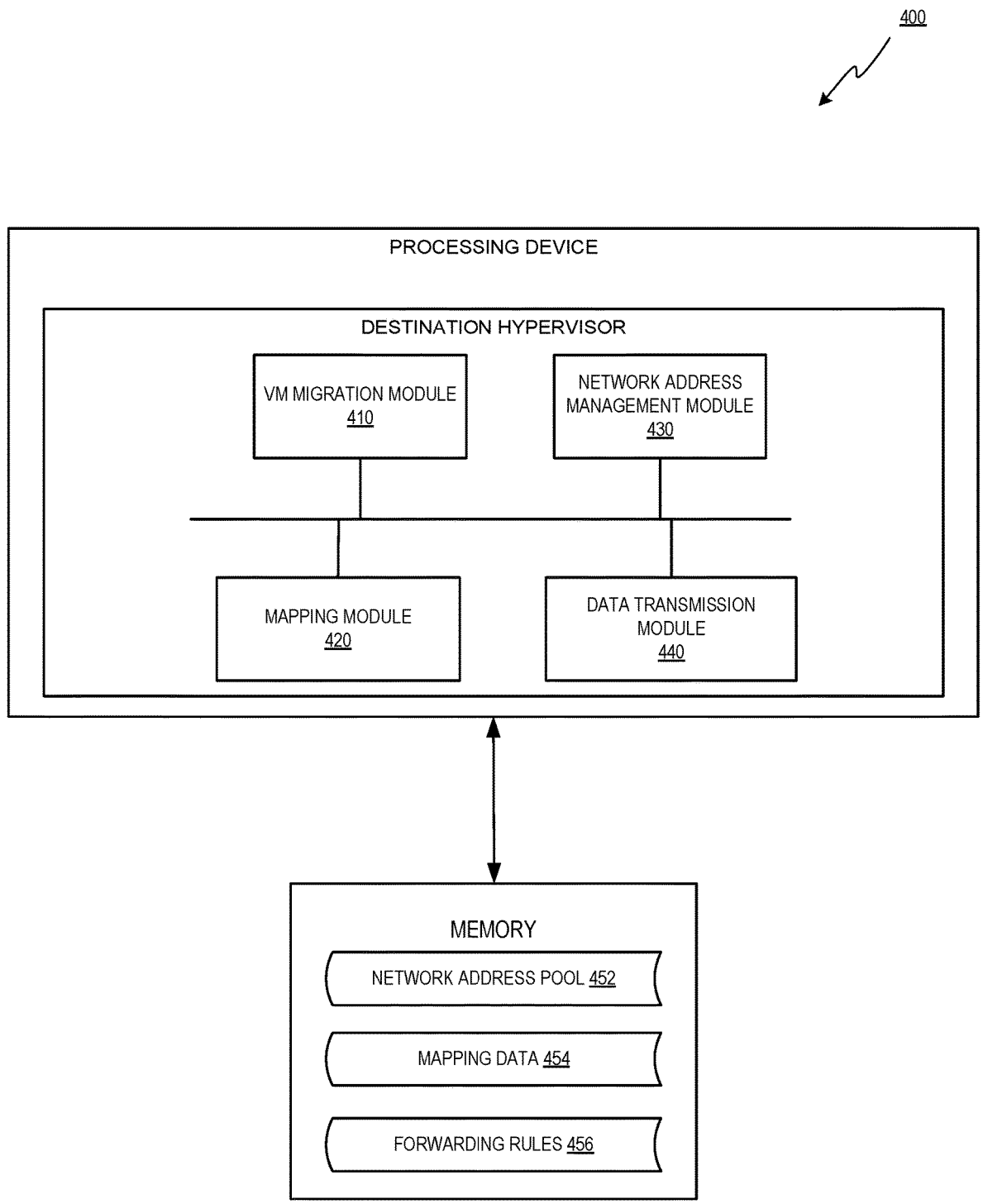
FIG. 4 depicts a block diagram of a computer system implementing a destination hypervisor in accordance with some implementations of the disclosure.

FIG. 4 depicts a block diagram of a computer system 400 operating in accordance with one or more aspects of the present disclosure. Computer system 400 may be the same or similar to computer system 100B and/or 100C and may include one or more processing devices and one or more memory devices. In the example shown, computer system 400 may include a virtual machine (VM) migration module 410, a data transmission module 440, a mapping module 420, and a network address management module 430 data.

VM migration module 410 can perform one or more operations to migrate a virtual machine from a source computer system to a destination computer system. For example, VM migration module 410 can perform one or more copying operations to copy an execution state of the virtual machine from the source computer system to the destination computer system. More particularly, for example, VM migration module 410 can receive the execution state of the virtual machine from the source computer system and can store the execution state of the virtual machine in the destination computer system. As another example, VM migration module 410 can start the virtual machine on the destination computer system.

Network address management module 430 can manage a pool of network addresses for computer system 400 and/or the destination hypervisor. The pool of network addresses can be stored as network address pool 452 in a memory device communicatively coupled to the computer system 400. Network address pool 452 can include any suitable number of network addresses. For example, the number of network addresses in network address pool 452 can be equal to or greater than the number of virtual machine undergoing migration to computer system 400 in a predetermined period. In some embodiments, each of the network addresses in the pool can be and/or correspond to a temporary network address that is not associated with a virtual network interface of a virtual machine.

Network address management module 430 can manage the network addresses in network address pool 452 to enable live migration of virtual machines to computer system 400. For example, network address management module 430 can identify a virtual machine undergoing migration to computer system 400. The virtual machine can be regarded as undergoing migration to computer system when the migration of the virtual machine has been initiated and/or when one or more operations have been performed for the migration of the virtual machine. Network address management module 430 can determine a network address associated with a virtual network interface of the virtual machine (also referred to herein as the "first network address"). The first network address may be, for example, a data link layer address associated with the virtual network interface, such as a MAC address.

Network address management module 430 can assign a network address in network address pool 452 (also referred to herein as the "second network address") to the virtual machine. The second network address can be any network address in network address pool 452 that is not assigned to and/or used by other virtual machines. The second network address can be assigned to the virtual machine upon initiation of the migration of the virtual machine from a source computer system to computer system 400. Alternatively, the network address can be assigned to the virtual machine after one or more operations have been performed by computer system 400 for the migration of the virtual machine. Network address management module 430 can also generate data indicating the association of the virtual machine with the second network address. The data can be stored as part of mapping data 454 to indicate that the network address is not available for use by other virtual machines. In some embodiments, a message indicating the association between the virtual machine and the second network address may be transmitted to the source hypervisor.

Network address management module 430 can generate mapping data 454 that can be used to map the temporary network address to the first network address. The mapping data 454 can be using any suitable data structure (e.g., a table, a graph, etc.).

In some embodiments, when a predefined condition is satisfied (e.g., completion of network reconfiguration for the migration of the virtual machine), network address management module 430 can disassociate the second network address from the virtual machine and return the second network address to network address pool 452. Network address management module 430 can also generate data indicating the disassociation of the network address from the virtual machine and/or that the network address is available for use by other virtual machines. The mapping data can be updated to remove the association between the temporary network address and the first network address.

Mapping module 420 can enable the processing device to relay data for virtual machines running on computer system 400 in view of mapping data 454 and/or forwarding rules 456. The forwarding rules 456 may include one or more computer-implemented rules that can be used to forward data for a virtual machine. For example, forwarding rules 456 can include one or more rules that instruct the processing device to forward a data packet in view of a determination as to whether a destination address of the data packet matches a network address in network address pool 452. In some embodiments, the forwarding rules may include a rule that instructs the processing device to forward the data packet by forwarding the data packet in view of mapping data 454 in response to determining that the destination address matches a network address in network address pool 452. The forwarding rules may also include a rule that instructs the processing device to forward the data packet without referring to mapping data 454 in response to determining that the destination address does not match any network address in network address pool 452.

For example, upon receiving a data packet directed to a virtual machine, mapping module 420 can identify a destination address of the data packet and can determine whether the destination address matches any address in network address pool 452. In some embodiments, mapping module 420 can map the destination address to a network address associated with a virtual network interface of a virtual machine (e.g., the first network address) in response to determining that the destination addresses matches a network address in pool 452. Data transmission module 440 can then forward the data packet to the virtual machine in view of the first network address. For example, data transmission module 440 can replace the destination address of the data packet with the first network address to generate a modified data packet and can then forward the modified data packet to the virtual machine.

In an alternative embodiment, mapping module 420 can determine that the destination address of the data packet does not match any network address in network address pool 452. Mapping module 420 may further determine that the destination address corresponds to a network address associated with a virtual network interface of a virtual machine (e.g., a data link layer address (e.g., a MAC address)) running on computer system 300. Mapping module 420 can then forward the data packet to the virtual machine in view of the destination address of the data packet.

Figure 5:
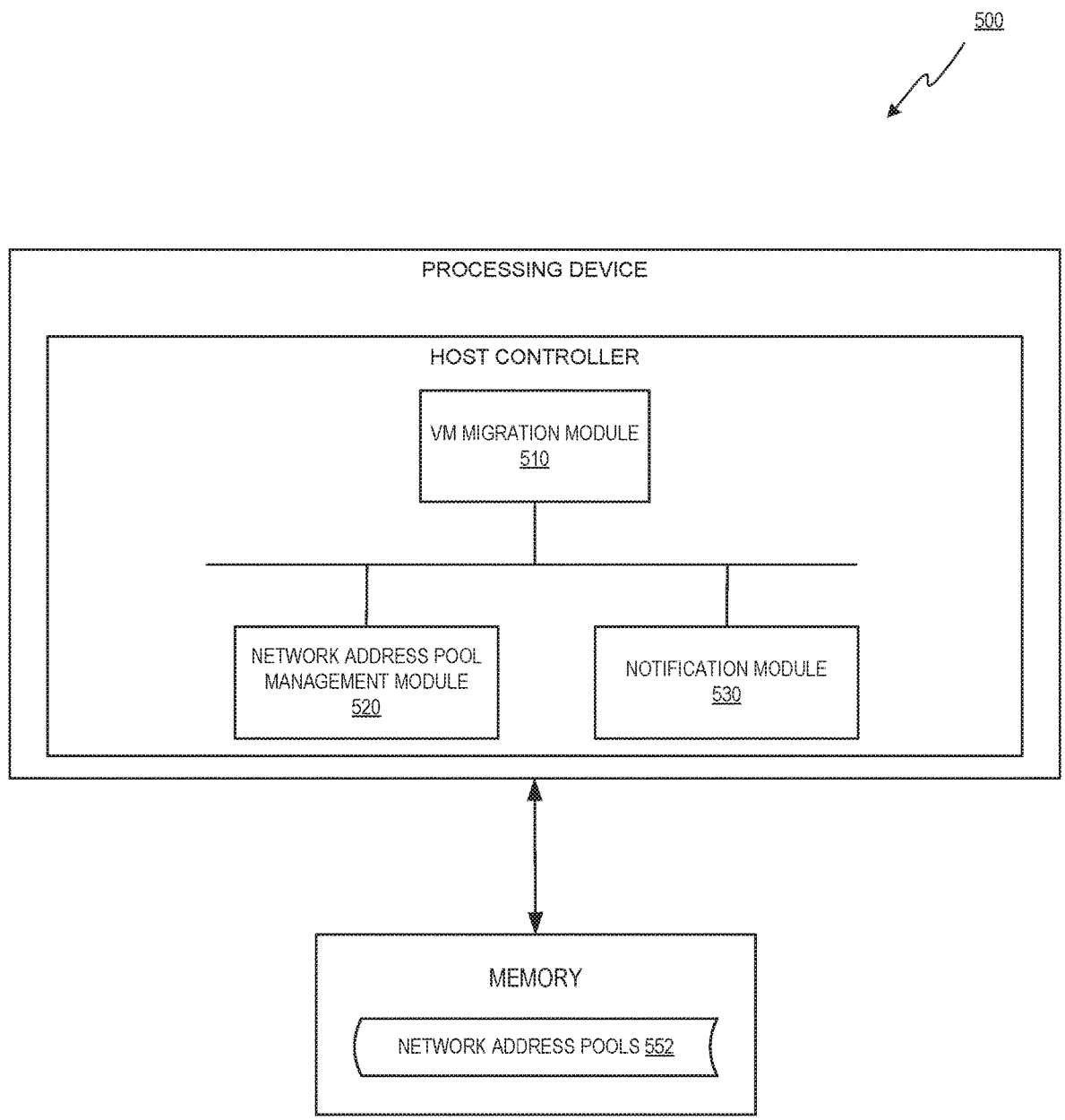
FIG. 5 depicts a block diagram of a computer system implementing a host controller in accordance with some implementations of the disclosure.

FIG. 5 depicts a block diagram of a computer system 500 operating in accordance with one or more aspects of the present disclosure. Computer system 500 may be the same or similar to host controller 105 and may include one or more processing devices and one or more memory devices. In the example shown, computer system 500 may include a virtual machine (VM) migration module 510, a network address pool management module 520, and a notification module 530.

VM migration module 510 can perform one or more operations to migrate a virtual machine from a source computer system to a destination computer system. For example, VM migration module 510 can perform one or more copying operations to copy an execution state of the virtual machine from the source computer system to the destination computer system. As another example, VM migration module 510 can stop the virtual machine on the source computer system. As still another example, VM migration module 510 can start the virtual machine on the destination computer system.

Network address pool management module 520 can generate and manage network address pools for one or more computer systems (e.g., computer systems 300, 400, 500, etc.). For example, network address pool management module 520 can determine the number of virtual machines undergoing migration to a computer system (e.g., computer system 300, 400, etc.) during a predetermined time period. Network address pool management module 520 can then generate a network address pool (e.g., network address pool 552) and associate the pool with the computer system and/or a hypervisor running on the computer system. In some embodiments, multiple network address pools 552 can be generated. Each of network address pools 552 can be associated with a computer system and/or a hypervisor running on the computer system. Each of network address pools 552 can include one or more network addresses (e.g., MAC addresses) that are not associated with a virtual network interface of a virtual machine.

Notification module 530 can receive, generate, process, send, etc. notifications including information related to network address pools 552. For example, notification module 530 can generate one or more notifications indicating an association between a network address pool 552 and a computer system. The notification module 530 can also broadcast the notifications to one or more other computer systems. As another example, notification module 530 can receive a notification indicating an association of a virtual machine address with a temporary network address in a network address pool 552. Notification module 530 can then broadcast a notification indicating the association of the temporary network address with the virtual machine to one or more other computer systems.

Figure 6:
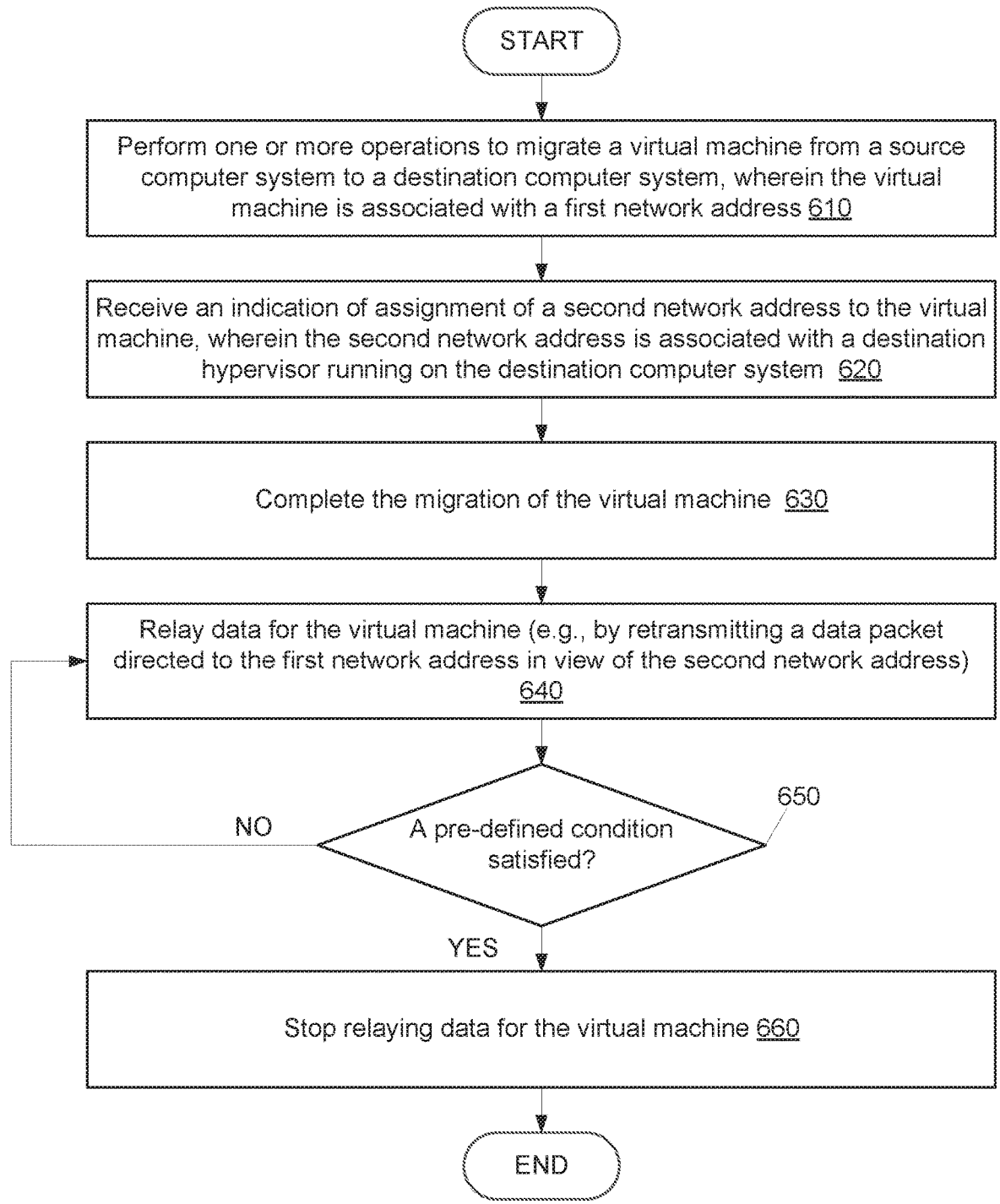
FIG. 6 is a flow diagram illustrating a method for virtual machine migration by a source hypervisor according to some implementations of the disclosure.

FIG. 6 is a flow diagram illustrating a method 600 for virtual machine migration by a source hypervisor according to an implementation of the disclosure. Method 600 can be performed by processing logic that may comprise hardware (e.g., circuitry, dedicated logic, programmable logic, microcode, etc.), software (such as instructions run on a processing device), firmware, or a combination thereof. In one implementation, method 600 is performed by a processing device (e.g. a processing device 1102 of FIG. 11) of a source computer system as described in connection with FIGS. 1A, 1B, and 3. In some embodiments, method 600 can be performed by a source hypervisor running on the source computer system.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computer devices. The term "article of manufacture," as used herein, is intended to encompass a computer program accessible from any computer-readable device or memory page media.

Referring to FIG. 6, method 600 begins at block 610 where the processing device performs one or more operations to migrate a virtual machine from a source computer system to a destination computer system. For example, the processing device can perform one or more copying operations to copy execution states of the virtual machine from the source computer system to the destination computer system. In some embodiments, the virtual machine is associated with a first network address. The first network address may be, for example, a MAC address associated with a virtual network interface of the virtual machine.

At block 620, the processing device can receive an indication of an association of a second network address with the virtual machine. The second network address may be a network address in a network address pool. In some embodiments, the network address pool is associated with the destination computer system. In some embodiments, the indication may be received via one or more messages transmitted from the destination hypervisor.

At block 630, the processing device can perform at least one operation to complete the migration of the virtual machine. For example, the processing device can stop the virtual machine on the source computer system and can disassociate the virtual machine from the source hypervisor. As another example, the processing device can also copy one or more remaining modified memory pages related to the virtual machine.

At block 640, the processing device can relay data for the virtual machine. For example, upon receiving a data packet directed to the first network address, the processing device can retransmit the data packet to the virtual machine running on the destination computer system. More particularly, for example, the processing device can change the destination address of the data packet to the second network address and can then forward the data packet to the destination computer system.

At block 650, the processing device can determine whether a predefined condition is satisfied. The satisfaction of the predefined condition may indicate completion of network reconfiguration for the migration of the virtual machine. In some embodiments, determining that the predetermined condition is satisfied comprises determining that a predetermined time period has passed after the migration of the virtual machine. In some embodiments, determining that the predetermined condition is satisfied comprises determining that the source hypervisor has received a first amount of data addressed to the virtual machine during a predetermined time period after the migration of the virtual machine and that the first amount of data is not greater than a threshold amount of data. In some embodiments, determining that the predetermined condition is satisfied comprises determining that the destination hypervisor has received, from a threshold number of network devices, data addressed to the virtual machine.

In some embodiments, the processing device can loop back to block 640 in response to determining that the predefined condition is not satisfied. Alternatively, the processing device can proceed to block 660 and can stop relaying data for the virtual machine in response to determining that the predefined condition is satisfied.

Figure 7:
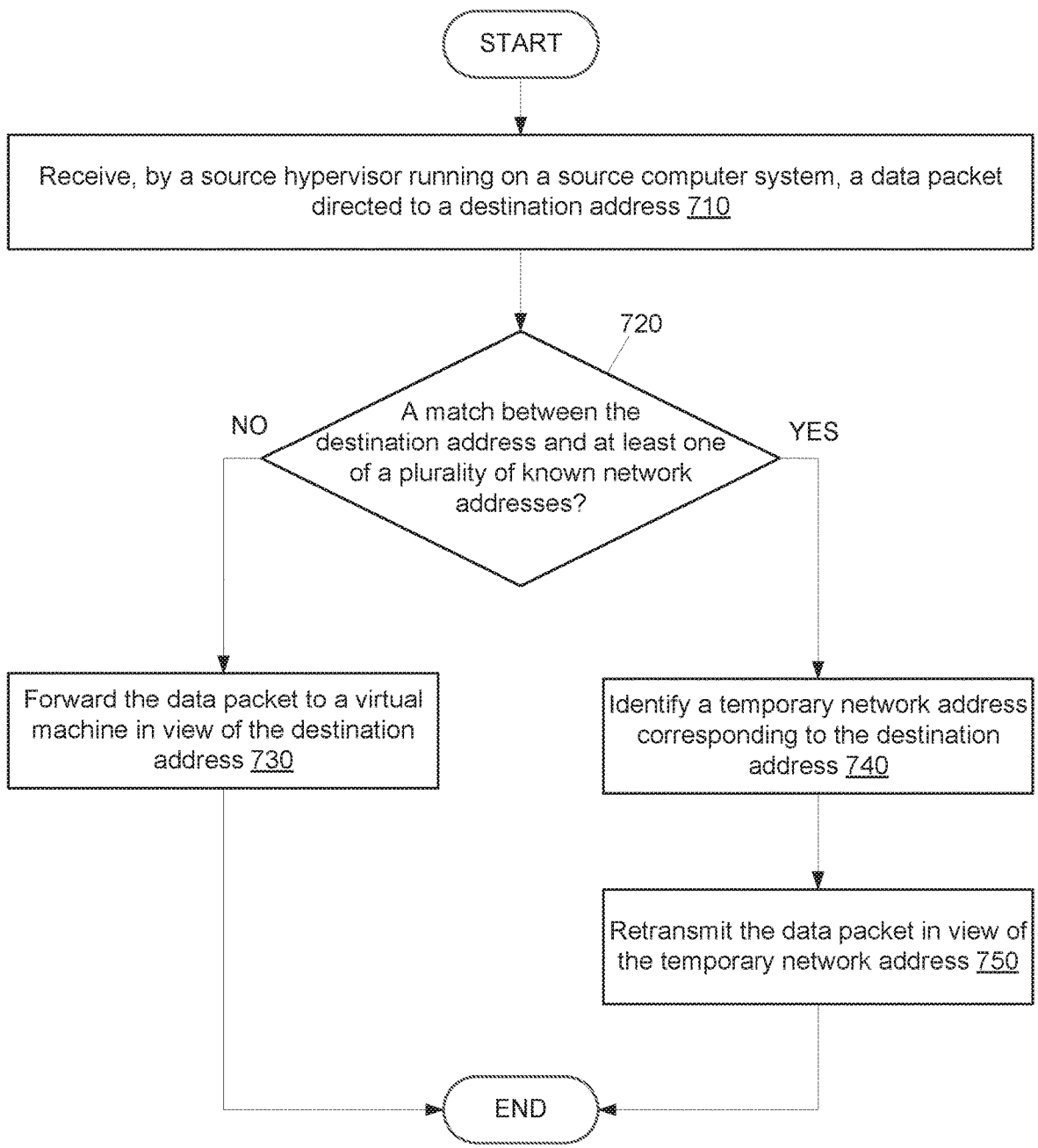
FIG. 7 is a flow diagram illustrating a method for relaying data for migrating virtual machines using a source hypervisor according to some implementations of the disclosure.

FIG. 7 is a flow diagram illustrating a method 700 for relaying data for virtual machines using a source hypervisor according to an implementation of the disclosure. Method 700 can be performed by processing logic that may comprise hardware (e.g., circuitry, dedicated logic, programmable logic, microcode, etc.), software (such as instructions run on a processing device), firmware, or a combination thereof. In one implementation, method 700 is performed by a processing device (e.g. a processing device 1102 of FIG. 11) of a source computer system as described in connection with FIGS. 1A, 1B, and 3. In some embodiments, method 700 can be performed by a source hypervisor running on the source computer system.

Method 700 can begin at block 710 where the source hypervisor receives a data packet. The data packet can be received from a network device (e.g., a switch, a bridge, etc.) or any other suitable device that is capable of transmitting data. The data packet may be directed to a destination address. The destination address may include any suitable network address, such as a data link layer address (e.g., a MAC address).

At block 720, the processing device can determine whether the destination address matches at least one of a plurality of known network addresses. In some embodiments, each of the known network addresses is associated with a virtual machine that has been migrated from the source computer system to a destination computer system (e.g., a virtual machine that has been stopped on the source computer system and/or started on the destination computer system).

In some embodiments, the processing device can proceed to block 730 in response to determining that the destination address does not match any of the known network addresses. At block 730, the processing device can forward the data packet to a virtual machine in view of the destination address of the data packet. For example, the data packet can be forwarded to a virtual machine running on the source computer system via a virtual network interface of the virtual machine that is associated with the destination address.

Alternatively, the processing device can proceed to block 740 in response to determining that the destination address matches at least one of the known network addresses. At block 740, the processing device can identify a temporary network address corresponding to the destination address. The temporary network address can be identified in view of mapping data 354 as described in conjunction with FIG. 3.

At block 750, the processing device can retransmit the data packet in view of the temporary network address. For example, the processing device can modify the data packet by changing the destination of the data packet to the temporary network address. The processing device can then transmit the modified data packet to a hypervisor and/or a computer system associated with the temporary network address.

Figure 8:
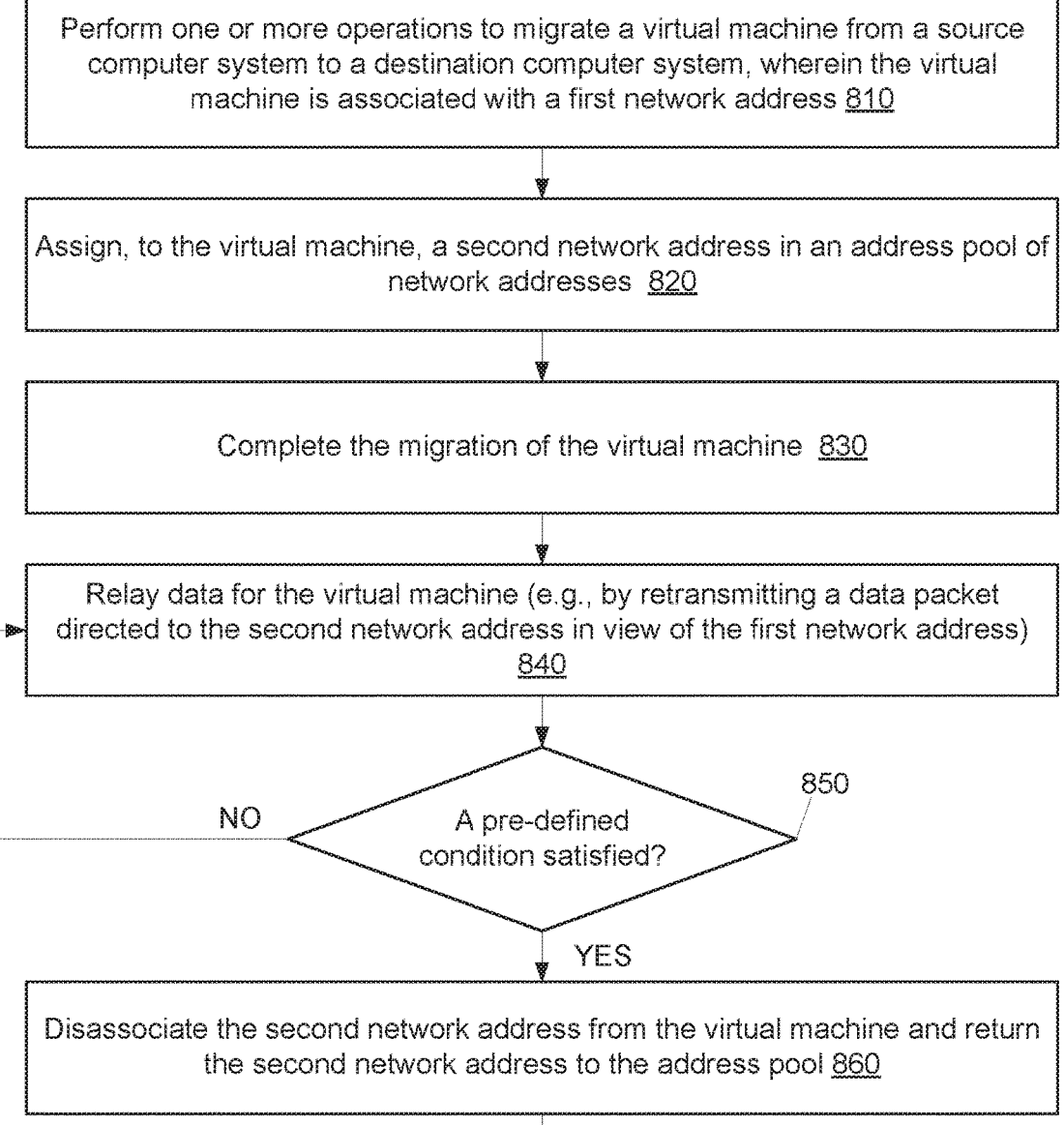
FIG. 8 is a flow diagram illustrating a method for virtual machine migration by a destination hypervisor according to some implementations of the disclosure.

FIG. 8 is a flow diagram illustrating a method 800 for virtual machine migration by a destination hypervisor according to an implementation of the disclosure. Method 800 can be performed by processing logic that may comprise hardware (e.g., circuitry, dedicated logic, programmable logic, microcode, etc.), software (such as instructions run on a processing device), firmware, or a combination thereof. In one implementation, method 800 is performed by a processing device (e.g. a processing device 1102 of FIG. 11) of a destination computer system as described in connection with FIGS. 1A, 1B, and 4. In some embodiments, method 800 can be performed by a destination hypervisor running on the destination computer system to facilitate migration of virtual machines from a source computer system to the destination computer system.

Method 800 begins at block 810 where the processing device performs one or more operations to migrate a virtual machine from a source computer system to a destination computer system. For example, the processing device can perform one or more copying operations to copy execution states of the virtual machine from the source computer system to the source computer system. More particularly, for example, the processing device can receive the execution states of the virtual machine from the source computer system and stored the execution states in the destination computer system. In some embodiments, the virtual machine is associated with a first network address. The first network address may be, for example, a MAC address associated with a virtual network interface of the virtual machine.

At block 820, the processing device can assign a second network address to the virtual machine. The second network address may be a temporary address in a network address pool. The network address pool may be associated with the destination computer system and/or the destination hypervisor. In some embodiments, the processing device can also generate a message indicating the association of the virtual machine with the second network address. The processing device can transmit the message to the source hypervisor (e.g., via a host controller).

At block 830, the processing device can perform at least one operation to complete the migration of the virtual machine. For example, the processing device can stop the virtual machine on the source computer system and can disassociate the virtual machine from the source hypervisor. As another example, the processing device can also copy one or more remaining modified memory pages related to virtual machine.

At block 840, the processing device can relay data for the virtual machine. For example, upon receiving a data packet directed to the second network address, the processing device can forward the data packet to the virtual machine running on the destination computer system. More particularly, for example, the processing device can change the destination address of the data packet to the first network address and can then forward the data packet to the virtual machine via a virtual network interface of the virtual machines that is associated with the first address. In some embodiments, to relay data for the virtual machine, the processing device can perform one or more operations as described in connection with FIG. 9 below.

At block 850, the processing device can determine whether a predefined condition is satisfied. Satisfaction of the predefined condition may indicate completion of network reconfiguration for the migration of the virtual machine. Block 850 may be performed in a substantially similar manner as block 650, as described with respect to FIG. 6.

In some embodiments, the processing device can loop back to block 840 in response to determining that the predefined condition is not satisfied. Alternatively, the processing device can proceed to block 860 and can disassociate the second network address from the virtual machine in response to determining that the predefined condition is satisfied. The processing device can also return the second network address to the network address pool for use to relay data for another virtual machine (e.g., a virtual machine undergoing migration to the destination computer system).

Figure 9:
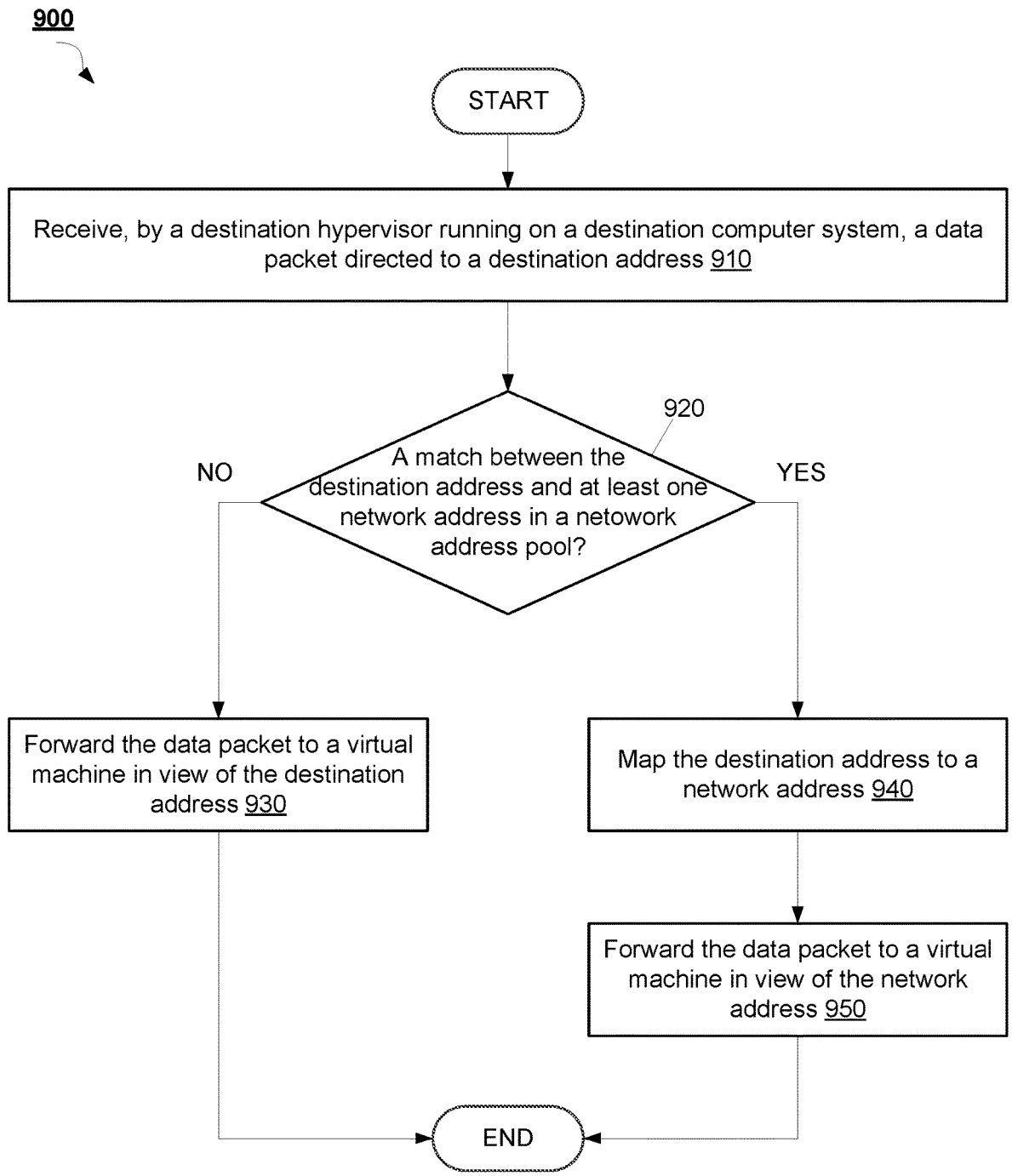
FIG. 9 is a flow diagram illustrating a method for relaying data for migrating virtual machines using a destination hypervisor according to some implementations of the disclosure.

FIG. 9 is a flow diagram illustrating a method 900 for relaying data for virtual machine migration by a destination hypervisor according to an implementation of the disclosure. Method 900 can be performed by processing logic that may comprise hardware (e.g., circuitry, dedicated logic, programmable logic, microcode, etc.), software (such as instructions run on a processing device), firmware, or a combination thereof. In one implementation, method 900 is performed by a processing device (e.g. a processing device 1102 of FIG. 11) of a destination computer system as described in connection with FIGS. 1A, 1B, and 3. In some embodiments, method 900 can be performed by a destination hypervisor on a destination computer system to facilitate migration of virtual machines from a source computer system to the destination computer system.

Method 900 begins at block 910 where the destination hypervisor receives a data packet directed to a destination address. The destination address may include a network address, such as a MAC address.

At block 920, the processing device can determine whether the first destination address matches at least one network address in a network address pool. The network address pool may be associated with the destination hypervisor. The network address pool may include one or more network addresses that are not associated with a virtual network interface of a virtual machine.

In some embodiments, the destination hypervisor can proceed to block 930 in response to determining that the destination address of the data packet does not match any address in the network address pool. At block 930, the destination hypervisor can forward the data packet in view of the destination address of the data packet. For example, the destination hypervisor can identify a virtual machine having a virtual network interface associated with the destination address. The destination hypervisor can forward the data packet to the virtual machine via the virtual network interface.

In some embodiments, the destination hypervisor can proceed to block 940 in response to determining that the destination address of the data packet matches a network address in the network address pool. At block 940, the processing device can map the destination address of the data packet to a network address associated with a virtual machine (e.g., a MAC address associated with a virtual network interface of the virtual machine). The mapping can be performed based on the mapping data 454 as described in connection with FIG. 4.

At block 950, the processing device can forward the data packet to a virtual machine in view of the network address. In some embodiments, the data packet can be forwarded to the virtual machine via a virtual network interface of the virtual machine associated with the network address.

Figure 10:
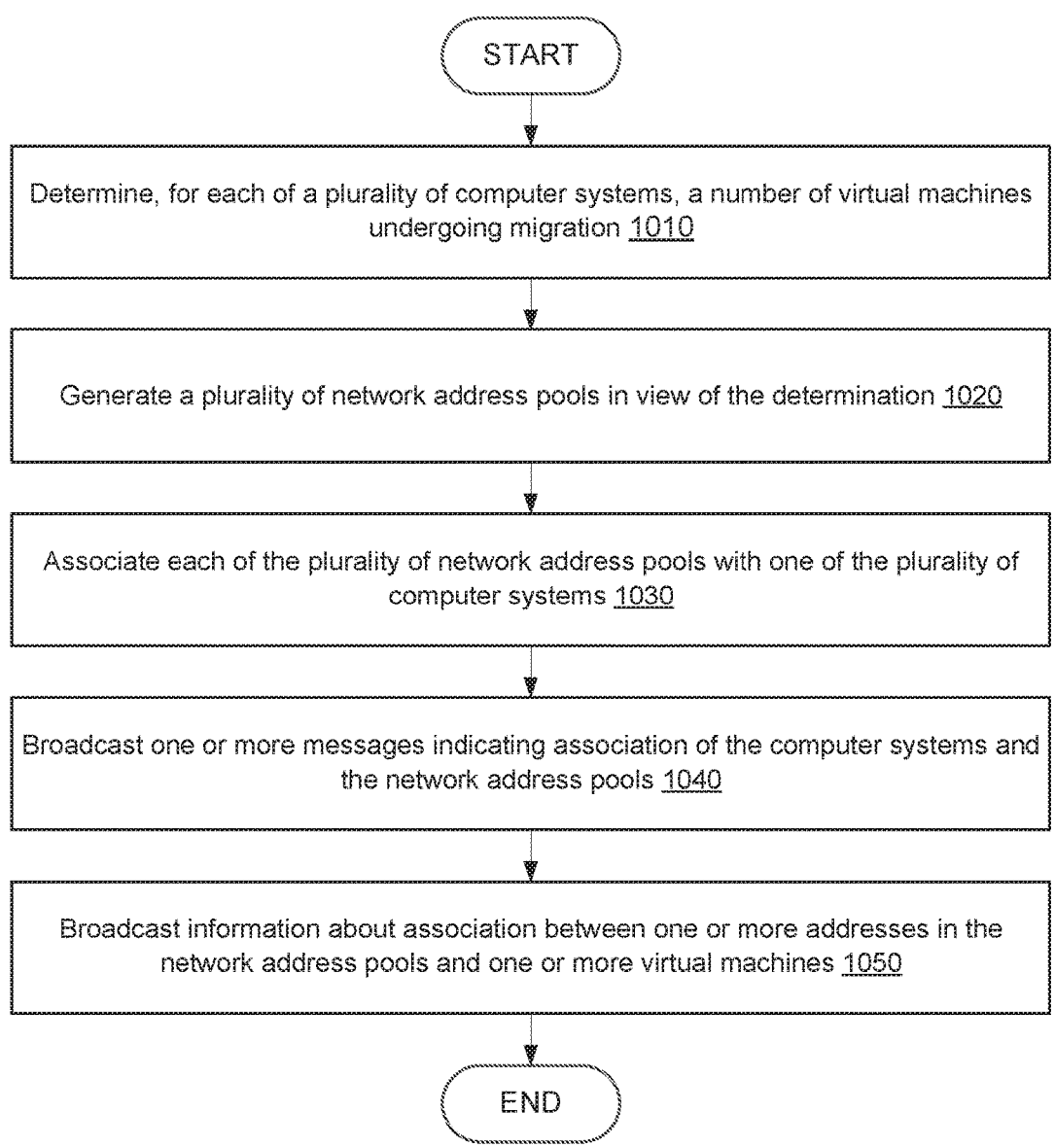
FIG. 10 is a flow diagram illustrating a method for managing network address pools for virtual machine migration according to some implementations of the disclosure.

FIG. 10 is a flow diagram illustrating a method 1000 for managing network address pools for virtual machine migration according to an implementation of the disclosure. Method 1000 can be performed by processing logic that may comprise hardware (e.g., circuitry, dedicated logic, programmable logic, microcode, etc.), software (such as instructions run on a processing device), firmware, or a combination thereof. In one implementation, method 1000 is performed by a processing device (e.g. a processing device 1102 of FIG. 11) of a host controller as described in connection with FIGS. 1A, 1B, and 5).

Method 1000 begins at block 1010 where the processing device determines, for each of a plurality of computer systems, a number of virtual machines undergoing migration. For example, the processing device may determine the number of virtual machines that are migrated to each of the computer systems during a predetermined time period.

At block 1020, the processing device can generate a plurality of network address pools in view of the determination. For example, the processing device can determine that a first number of virtual machines undergoing migration to a first computer system during a predetermined time period. The processing device can then generate, in view of the first number, a first network address pool for the first computer system. More particularly, for example, the processing device can determine a second number based on the first number and generate the first network address pool to include the second number of network addresses. In some embodiments, the second number is equal to or greater than the first number.

At block 1030, the processing device can associate each of the plurality of network address pools with one of the plurality of computer systems. For example, a first network address pool and a second network address pool can be assigned to a first computer system and a second computer system, respectively. The processing device can also store data about the association of the network address pools with the computer systems.

At block 1040, the processing device can broadcast one or more messages indicating an association of the computer systems and the network address pools. The messages can be broadcast to the computer systems and/or any other computer system.

At block 1050, the processing device can broadcast information about the association between one or more addresses in the network address pools and one or more virtual machines. For example, the processing device can receive, from the first computer system, a message indicating an association between a first virtual machine and a first network address in the first network address pool. The first virtual machine may be migrated to the first computer system. The processing device can broadcast one or more messages indicating the association between the first virtual machine and the first network address.

In some embodiments, the processing device can determine that the virtual machine is migrated from the first computer system to a second computer system. This determination can be made, for example, based on information provided by the first computer system and/or the second computer system, such as a message indicating an association of the first virtual machine with a second network address in a second network address pool. The second network address pool may be associated with the second computer system and/or a hypervisor running on the second computer system. The processing device can broadcast one or more messages indicating an association of the first virtual machine with the second network address.

As another example, the processing device can receive, from the first computer system, a message indicating an association between a second virtual machine and the first network address and/or disassociation of the first network address from the first virtual machine. The processing device can then broadcast one or more messages to notify the computer systems of the association of the second virtual machine with the first network address and/or the disassociation of the first network address from the first virtual machine.

Figure 11:
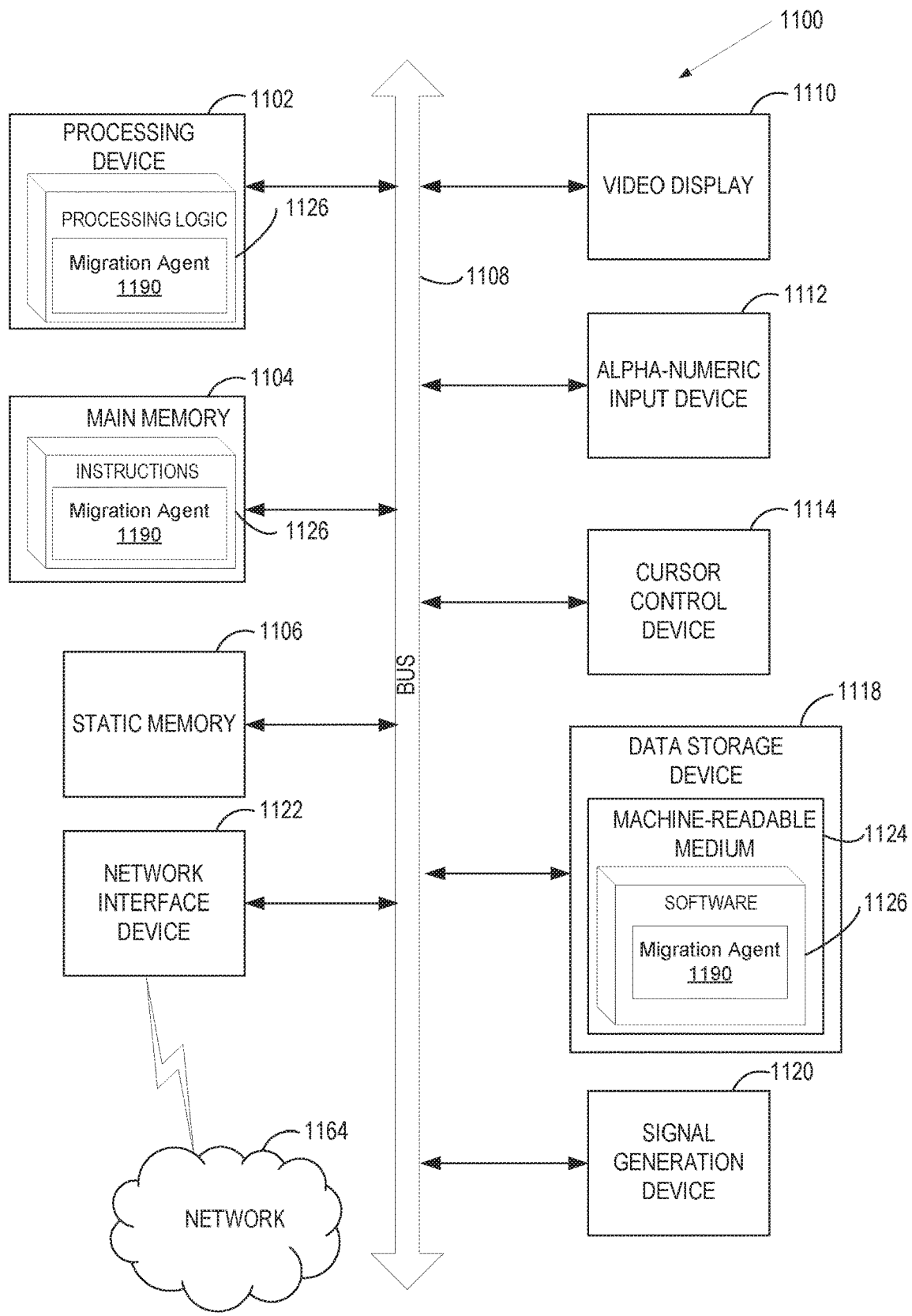
FIG. 11 illustrates a block diagram of one implementation of a computer system.

FIG. 11 illustrates a diagrammatic representation of a machine in the example form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1100 includes a processing device 1102 (e.g., processor, CPU, etc.), a main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1108.

Processing device 1102 represents one or more general-purpose processing devices such as a microprocessor, central processing unit, or the like. More particularly, the processing device may be complex instruction set computer (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute the processing logic 426 for performing the operations and steps discussed herein.

The computer system 1100 may further include a network interface device 1122 communicably coupled to a network 1164. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The data storage device 1118 may include a machine-accessible storage medium 1124 on which is stored software 1126 embodying any one or more of the methodologies or functions described herein. The software 1126 may also reside, completely or at least partially, within the main memory 1104 as instructions 1126 and/or within the processing device 1102 as processing logic 1126 during execution thereof by the computer system 1100; the main memory 1104 and the processing device 1102 also constituting machine-accessible storage media.

The machine-readable storage medium 1124 may also be used to store instructions 1126 to implement a migration agent 1190 and/or a software library containing methods that call the above applications. Migration agent 1190 can implement live virtual machine migration by performing one or more operations described in connection with FIGS. 1-11 above. While the machine-accessible storage medium 1124 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Other computer system designs and configurations may also be suitable to implement the system and methods described herein. The following examples illustrate various implementations in accordance with one or more aspects of the present disclosure.

Example 1 is a method comprising: performing, by a processing device, at least one operation to migrate a virtual machine from a source computer system to a destination computer system, wherein the virtual machine is associated with a first network address; receiving an indication of assignment of a second network address to the virtual machine, wherein the second network address is associated with a destination hypervisor running on the destination computer system; receiving, from a network device, a data packet directed to a destination address; and in response to determining that the destination address matches the first network address, transmitting, to the destination hypervisor, the data packet in view of the second network address.

Example 2 is the method of example 1, further comprising changing the destination address of the data packet to the second network address before transmitting the data packet to the destination hypervisor.

Example 3 is the method of example 1, wherein the first network address comprises a Media Access Control (MAC) address, and wherein the second network address comprises a second MAC address.

Example 4 is the method of example 1, wherein the at least one operation comprises copying an execution state of the virtual machine.

Example 5 is the method of example 1, wherein the at least one operation comprises stopping the virtual machine on the source computer system.

Example 6 is the method of example 1, further comprising stopping forwarding data for the virtual machine in response to determining that a predetermined condition is satisfied.

Example 7 is the method of example 6, wherein determining that the predetermined condition is satisfied further comprises: determining that the source hypervisor has received a first amount of data addressed to the virtual machine during a predetermined time period; and determining that the first amount of data is not greater than a threshold amount of data.

Example 8 is the method of example 7, wherein determining that the predetermined condition is satisfied further comprises determining that a predetermined time period has passed after the migration of the virtual machine.

Example 9 is the method of example 1, wherein determining that the destination address matches the first network address further comprises determining whether the destination address of the packet matches at least one of a plurality of known network addresses, wherein each of the known network addresses is associated with a virtual machine that has been migrated from the source computer system.

Example 10 is a method comprising: performing, by a processing device, at least one operation to migrate a virtual machine from a source computer system to a destination computer system, wherein the virtual machine is associated with a first network address; assigning, to the virtual machine, a second network address of a pool of network addresses, wherein the pool of network addresses is associated with a destination hypervisor running on the destination computer system; receiving, from a source hypervisor running on the source computer system, a data packet directed to the second network address; and forwarding, by the destination hypervisor, the data packet to the virtual machine in view of the first network address.

Example 11 is the method of example 10, wherein the first network address comprises a first Media Access Control (MAC) address, and wherein the second network address comprises a second MAC address.

Example 12 is the method of example 10, wherein forwarding the data packet to the virtual machine further comprises changing the destination address of the data packet to the first network address.

Example 13 is the method of example 10, wherein the at least one operation comprises copying an execution state of the virtual machine.

Example 14 is the method of example 10, wherein the at least one operation comprises starting the virtual machine on the destination computer system.

Example 15 is the method of example 10, further comprising broadcasting a first message indicating an association between the pool of network addresses and the destination hypervisor.

Example 16 is the method of example 10, further comprising forwarding, to the source hypervisor, a second message indicating an association between the virtual machine and the second network address.

Example 17 is the method of example 10, further comprising: determining whether the pool of network addresses is exhausted; and in response to determining that the pool of network addresses is not exhausted, assigning the second address to the virtual machine.

Example 18 is the method of example 10, wherein forwarding the data packet in view of the first network address comprises: determining that a destination address of the data packet matches the second network address; and changing the destination address of the data packet to the first network address.

Example 19 is the method of example 10, further comprising: determining whether a predefined condition is satisfied; and forwarding, via the source hypervisor, the data packet to the virtual machine in response to determining that the predefined condition is not satisfied.

Example 20 is the method of example 19, wherein determining the predetermined condition is satisfied comprises: determining that the source hypervisor has received a first amount of data addressed to the virtual machine during a predetermined time period; and determining that the first amount of data is not greater than a threshold amount of data.

Example 21 is the method of example 19, wherein determining the predetermined condition is satisfied comprises determining that a predetermined time period has passed after the migration of the virtual machine.

Example 22 is the method of example 19, wherein determining the predetermined condition is satisfied comprises determining that the destination hypervisor has received, from a threshold number of network devices, data addressed to the virtual machine.

Example 23 is the method of example 19, further comprising disassociating the second network address from the virtual machine in response to determining that the predefined condition is satisfied.

Example 24 is the method of example 23, further comprising returning the second network address to the pool of network addresses.

Example 25 a method comprising: receiving, by a destination hypervisor running on a destination computer system, a data packet directed to a destination address; determining whether the destination address of the data packet matches at least one network address of a pool of network addresses associated with the destination computer system; mapping, by a processing device, the destination address to a first network address associated with a first virtual machine in response to determining that the destination address matches a second network address of the pool of network addresses; and forwarding the data packet to the first virtual machine in view of the first network address.

Example 26 is the method of example 25, wherein the first network address is associated with a virtual network interface of the first virtual machine.

Example 27 is the method of example 25, further comprising forwarding the data packet to a second virtual machine in view of the destination address in response to determining that the destination address does not match any network address of the pool of network addresses, wherein the destination address is associated with a virtual network interface of the second virtual machine.

Example 28 is a method, comprising: determining, for each of a plurality of computer systems, a number of virtual machines undergoing migration; generating a plurality of network address pools in view of the determination; associating each of the plurality of network address pools with one of the plurality of computer systems; and broadcasting a first message indicating an association of a virtual machine with a first network address in a first network address pool of the network address pools, wherein the virtual machine is migrated to a first computer system of the plurality of computer systems, and wherein the first computer system is associated with the first network address pool.

Example 29 is the method of example 28, further comprising: determining that a first number of virtual machines undergoing migration to the first computer system during a predetermined time period; and generating, in view of the first number, the first network address pool comprising a second number of network addresses.

Example 30 is the method of example 29, wherein the second number is not greater than the first number.

Example 31 is the method of example 29, wherein the first network address comprises a first Media Access Control (MAC) address.

Example 32 is the method of example 29, further comprising: determining that the virtual machine is migrated from the first computer system to a second computer system; and broadcasting a second message indicating an association between the virtual machine and a second network address in a second network address pool, wherein the second pool of network addresses is associated with the second computer system.

Example 33 is the method of example 32, further comprising: determining whether a predetermined condition is satisfied, wherein satisfaction of the predetermined condition indicates completion of network configuration for migration of the virtual machine from the source computer system to the first computer system; and broadcasting the second message in response to determining that the predetermined condition is not satisfied.

Example 34 is the method of example 32, further comprising broadcasting a third message indicating disassociation of the virtual machine from the first network address.

Example 35 is the method of example 32, wherein the second network address comprises a second MAC address.

Example 36 is the method of example 28, wherein further comprising broadcasting a fourth message indicating an association of the first computer system with the first network address pool.

Example 37 is an apparatus comprising: a processing device; and means for migrating a virtual machine from a source computer system to a destination computer system; means for assigning, to the virtual machine, a second network address of a pool of network addresses, wherein the pool of network addresses is associated with a destination hypervisor running on the destination computer system; means for receiving, from a source hypervisor running on the source computer system, a data packet; and means for forwarding, via the destination hypervisor, the data packet to the virtual machine in response to determining that a destination address of the data packet matches the second network address.

Example 38 is the apparatus of claim 37, further comprising the subject matter of any of examples 1-37.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "assigning," "providing," "executing," "removing," "copying," "storing," "broadcasting," "reassigning," "storing," "allocating," "determining," "associating," or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
performing, by a processing device, at least one operation to migrate a virtual machine from a source computer system to a destination computer system, wherein the virtual machine is associated with a first network address;
identifying a pool of network addresses that is associated with a destination hypervisor running on the destination computer system, wherein none of the network addresses in the pool associated with the destination hypervisor is assigned to any virtual machine, and wherein the pool of network addresses is to be used by the destination hypervisor for virtual machine migrations to the destination computer system;
assigning, to the virtual machine, a second network address from the pool of network addresses, wherein an association between the virtual machine and the second network address is to be provided to a source hypervisor running on the source computer system;
receiving, from the source hypervisor running on the source computer system, a data packet initially directed to the first network address and then forwarded to the destination hypervisor using the second network address; and
forwarding, by the destination hypervisor, the data packet to the virtual machine.

2. The method of claim 1, wherein the first network address comprises a first Media Access Control (MAC) address, and wherein the second network address comprises a second MAC address.

3. The method of claim 1, wherein a destination address of the data packet was changed to the second network address in response to determining that the destination address of the data packet matches the first network address.

4. The method of claim 1, wherein the at least one operation comprises receiving and storing an execution state of the virtual machine.

5. The method of claim 1, wherein the at least one operation comprises starting the virtual machine on the destination computer system.

6. The method of claim 1, further comprising receiving a first message indicating an association between the pool of network addresses and the destination hypervisor.

7. The method of claim 1, further comprising forwarding, to the source hypervisor, a second message indicating the association between the virtual machine and the second network address.

8. The method of claim 1, wherein forwarding the data packet comprises:
determining that a destination address of the data packet matches the second network address; and
changing the destination address of the data packet to the first network address.

9. The method of claim 1, further comprising:
determining whether a predefined condition is satisfied; and
disassociating, by the destination hypervisor, the second network address from the virtual machine in response to determining that the predefined condition is satisfied.

10. The method of claim 9, wherein determining whether the predefined condition is satisfied comprises:
determining that a first amount of data directed to the first network address of the virtual machine during a predetermined time period exceeds a threshold amount of data.

11. The method of claim 9, wherein determining whether the predefined condition is satisfied comprises determining that a predetermined time period has passed after the migration of the virtual machine.

12. The method of claim 9, wherein determining whether the predefined condition is satisfied comprises determining that the destination hypervisor has received, from a threshold number of network devices, data addressed to the virtual machine.

13. A system comprising:
a memory; and
a processing device operatively coupled to the memory, the processing device to:
perform at least one operation to migrate a virtual machine from a source computer system to a destination computer system, wherein the virtual machine is associated with a first network address;
identify a pool of network addresses that is associated with a destination hypervisor running on the destination computer system, wherein none of the network addresses in the pool associated with the destination hypervisor is assigned to any virtual machine, and wherein the pool of network addresses is to be used by the destination hypervisor for virtual machine migrations to the destination computer system;
assign, to the virtual machine, a second network address from the pool of network addresses, wherein an association between the virtual machine and the second network address is to be provided to a source hypervisor running on the source computer system;
receive, from the source hypervisor running on the source computer system, a data packet initially directed to the first network address and then forwarded to the destination hypervisor using the second network address; and
forward, by the destination hypervisor, the data packet to the virtual machine.

14. The system of claim 13, wherein the first network address comprises a first Media Access Control (MAC) address, and wherein the second network address comprises a second MAC address.

15. The system of claim 13, wherein a destination address of the data packet was changed to the second network address in response to determining that the destination address of the data packet matches the first network address.

16. The system of claim 13, wherein the at least one operation comprises receiving and storing an execution state of the virtual machine.

17. The system of claim 13, wherein the at least one operation comprises starting the virtual machine on the destination computer system.

18. The system of claim 13, wherein, to forward the data packet, the processing device is further to:
determine that a destination address of the data packet matches the second network address; and
change the destination address of the data packet to the first network address.

19. The system of claim 13, wherein the processing device is further to:
determine whether a predefined condition is satisfied; and
disassociate, by the destination hypervisor, the virtual machine from the second network address in response to determining that the predefined condition is satisfied.

20. A non-transitory machine-readable storage medium including instructions that, when accessed by a processing device, cause the processing device to:
- perform at least one operation to migrate a virtual machine from a source computer system to a destination computer system, wherein the virtual machine is associated with a first network address;
- identify a pool of network addresses that is associated with a destination hypervisor running on the destination computer system, wherein none of the network addresses in the pool associated with the destination hypervisor is assigned to any virtual machine, and wherein the pool of network addresses is to be used by the destination hypervisor for virtual machine migrations to the destination computer system;
- assign, to the virtual machine, a second network address from the pool of network addresses, wherein an association between the virtual machine and the second network address is to be provided to a source hypervisor running on the source computer system;
- receive, from the source hypervisor running on the source computer system, a data packet initially directed to the first network address and then forwarded to the destination hypervisor using the second network address; and
- forward, by the destination hypervisor, the data packet to the virtual machine.

\* \* \* \* \*

UNITED STATES PATENT AND TRADEMARK OFFICE
CERTIFICATE OF CORRECTION

| | |
|---|---|
| PATENT NO. | : 10,965,641 B2 |
| APPLICATION NO. | : 15/835151 |
| DATED | : March 30, 2021 |
| INVENTOR(S) | : Michael Tsirkin |

It is certified that error appears in the above-identified patent and that said Letters Patent is hereby corrected as shown below:

In Claim 1, Column 27, Line 17, after "machine," insert --wherein the pool of network addresses comprises a number of network addresses based on a number of virtual machines that migrate during a predetermined period of time,--

In Claim 13, Column 28, Line 26, after "machine," insert --wherein the pool of network addresses comprises a number of network addresses based on a number of virtual machines that migrate during a predetermined period of time,--

In Claim 20, Column 29, Line 12, after "machine," insert --wherein the pool of network addresses comprises a number of network addresses based on a number of virtual machines that migrate during a predetermined period of time,--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*